(12) United States Patent
Jesionowski et al.

(10) Patent No.: US 8,929,023 B1
(45) Date of Patent: Jan. 6, 2015

(54) INVENTORY MANAGEMENT FOR AUTOMATED DATA STORAGE LIBRARIES

(71) Applicant: International Business Machines Corporation, Armonk, NY (US)

(72) Inventors: Leonard G. Jesionowski, Tucson, AZ (US); Shawn M. Nave, Tucson, AZ (US); Anh T. Nguyen, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 14/276,951

(22) Filed: May 13, 2014

(51) Int. Cl.
*G11B 5/008* (2006.01)

(52) U.S. Cl.
USPC .................................................. 360/92.1

(58) Field of Classification Search
USPC .................................................. 360/92.1
See application file for complete search history.

(56) References Cited

U.S. PATENT DOCUMENTS

| | | | |
|---|---|---|---|
| 6,356,803 B1 | 3/2002 | Goodman et al. | |
| 7,177,723 B2 | 2/2007 | Starr et al. | |
| 7,349,168 B2 | 3/2008 | Yasue | |
| 7,505,224 B2 | 3/2009 | Chamorro et al. | |
| 7,843,663 B2 | 11/2010 | Nave et al. | |
| 8,135,494 B2 | 3/2012 | Jesionowski et al. | |
| 8,166,240 B2 | 4/2012 | McIntosh et al. | |
| 8,175,745 B2 * | 5/2012 | Compton et al. | 700/215 |
| 8,265,786 B2 | 9/2012 | Jesionowski et al. | |
| 8,290,612 B2 * | 10/2012 | Jesionowski et al. | 700/214 |
| 8,346,386 B2 | 1/2013 | Jesionowski et al. | |
| 2010/0042257 A1 | 2/2010 | Starr et al. | |

OTHER PUBLICATIONS

Brown, P., et al., "Computer-Controlled System for Sorting of Pathology Block Samples", Project 12—Design Review 5, Report—University of Michigan, Fall 2008, 97 pp.
IBM Corporation, "IBM System Storage TS3500 Tape Library", Data Sheet, 2013, 8 pp.
IBM Corporation, "Ultrium Bar Code Label", TS3500 Tape Library Information, [online], [Retrieved on Mar. 18, 2014], retrieved from the Internet at <URL: publib.boulder.ibm.com/infocenter/ts3500tl/v1r0/index.jsp?topic=%2Fcom.ibm.storage.ts3500.doc%2Fipg_3584_mehlab.html>, 2 pp.
Jesionowski, J., "IBM TotalStorage UltraScalable Tape Library 3584", Advanced Library Management System, Technology White Paper, 2004, 11 pp.

* cited by examiner

*Primary Examiner* — Mark Blouin
(74) *Attorney, Agent, or Firm* — William K. Konrad; Konrad Raynes Davda & Victor LLP

(57) ABSTRACT

In one embodiment, of inventory management for automated data storage libraries, a first subset of data storage cartridges is scanned and extracted from a multi-cartridge deep slot cell and transported to and filled into another multi-cartridge deep slot cell while maintaining tier order of the first subset. A second subset of data storage cartridges is scanned and extracted from the multi-cartridge deep slot cell and returned to its original multi-cartridge deep slot cell while maintaining tier order of the second subset. Other aspects are described herein.

25 Claims, 14 Drawing Sheets

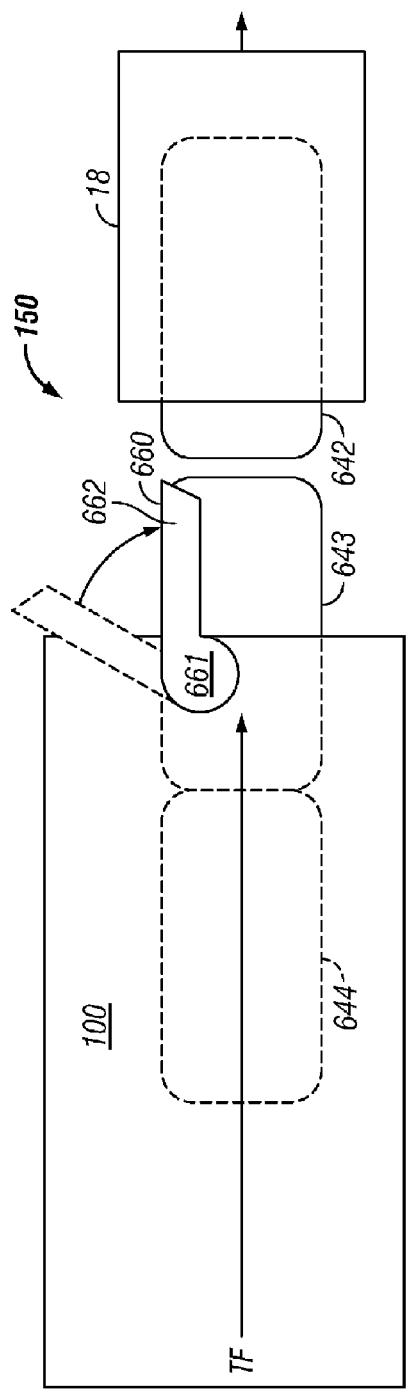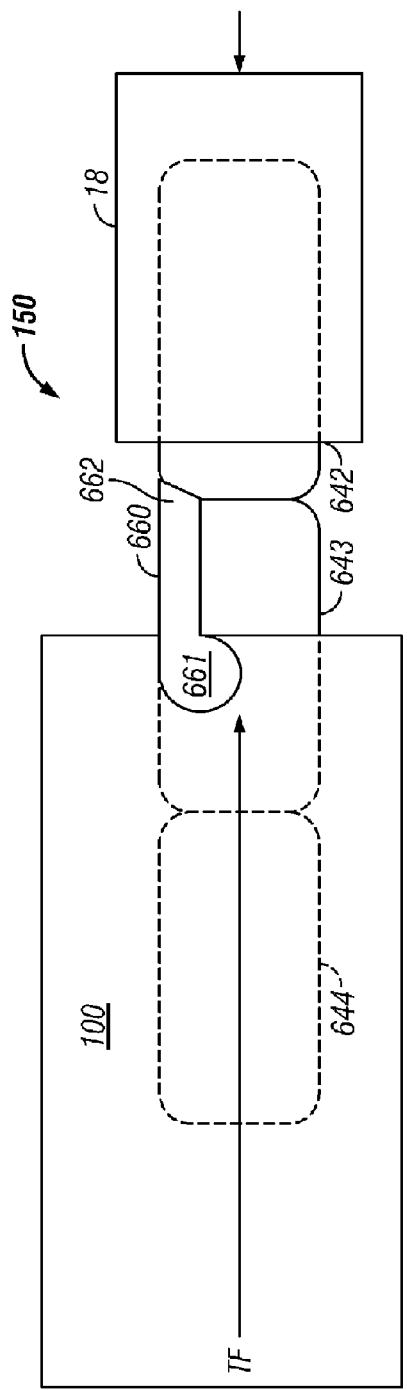
FIG. 8C
FIG. 8D

INVENTORY MANAGEMENT FOR AUTOMATED DATA STORAGE LIBRARIES

BACKGROUND

1. Field

This description relates in general to automated data storage libraries, and more particularly, to inventory management of data storage media in an automated data storage libraries.

2. Description of Related Art

Automated data storage libraries are known for providing cost effective storage and retrieval of large quantities of data. The data in automated data storage libraries is typically stored on media of data storage cartridges that are, in turn, stored in storage slots, often referred to as cells, inside the library in a fashion that renders the media, and its resident data, accessible for physical retrieval. Such data storage cartridges are commonly termed "removable media."

In an effort to increase storage capacity, deep slot technology allows for storage cells that contain more than a single data storage cartridge. Such storage libraries allow for higher density, or more cartridges stored per square foot. In 'deep slot' libraries, two or more cartridges may be stored in a multi-cartridge deep slot cell, arrayed in series, one behind the other, in tiers ranging from a front-most tier to a rearmost tier.

In automated tape libraries one function of the library is to manage the physical location of cartridges within the library. A process of determining the physical locations of all the cartridges in the library is often referred to as an "inventory." In many automated tape libraries, an inventory is performed by a robotic accessor scanning the serial number label on the front of each tape cartridge in the library as well as all locations in the library to determine which slots are empty and which are full.

In automated tape libraries where a three dimensional (3D) storage array is used to efficiently store a large number of cartridges, scanning the front label on the cartridge can be a time consuming task as the robotic accessor typically moves each tape cartridge located in front of a deeper tape cartridge stored inside the deep slot in order to scan the serial number label on the next-in-line tape cartridge. In very large automated tape libraries, with thousands of tape cartridges, the inventory process can take several hours to complete. Inventories are often initiated upon initial automated tape library installation, or when a bulk load/unload of tape cartridges occurs, or when a customer is required to verify a physical inventory.

One known method for an automated tape library inventory with deep slots involves the robotic accessor moving tape cartridges within the library to create two empty deep slots at the top or bottom of a column of deep slots within the automated tape library. Then moving cartridges with multiple grippers, each cartridge is moved from the full cells below or above the empty cells, scanning each cartridge as it goes. Once all the cartridges are moved from the original location to an original empty cell, the original location cells now become empty and the next two cells can follow the same process. The process is repeated for each column of the array of slots. In this manner, the empty cells are moved throughout the automated tape library as each tape cartridge is moved up or down two cells from its original location.

SUMMARY

In one aspect of the present description, operations and apparatus configured for such operations are described for inventorying data storage cartridges stored in an automated data storage library having a plurality of multi-cartridge deep slot cells, each configured to store up to a plurality of data storage cartridges arranged in sequential order of tiers from front to rear, wherein the operations include identifying a first multi-cartridge deep slot cell, scanning and extracting a first subset of data storage cartridges from a second multi-cartridge deep slot cell having a first plurality of data storage cartridges in a first tier order, transporting the extracted first subset of data storage cartridges to the first multi-cartridge deep slot cell, and filling each data storage cartridge of the transported first subset of data storage cartridges in an empty tier of the first multi-cartridge deep slot cell so that the first subset of data storage cartridges is stored in the first multi-cartridge deep slot cell while maintaining the first tier order of the first subset of data storage cartridges. In addition, the operations further include scanning and extracting a second subset of the first plurality of data storage cartridges from the second multi-cartridge deep slot cell, and filling each data storage cartridge of the second subset of data storage cartridges in an empty tier of the second multi-cartridge deep slot cell so that the second subset of data storage cartridges is stored in the second multi-cartridge deep slot cell while maintaining the first tier order of the second subset of data storage cartridges. Other aspects are described herein.

BRIEF DESCRIPTION OF THE DRAWINGS

FIGS. 8A, 8B, 8C, 8D illustrate one embodiment of a cartridge blocking mechanism for the cell of FIGS. 7A, 7B;

DETAILED DESCRIPTION

Figure 1:
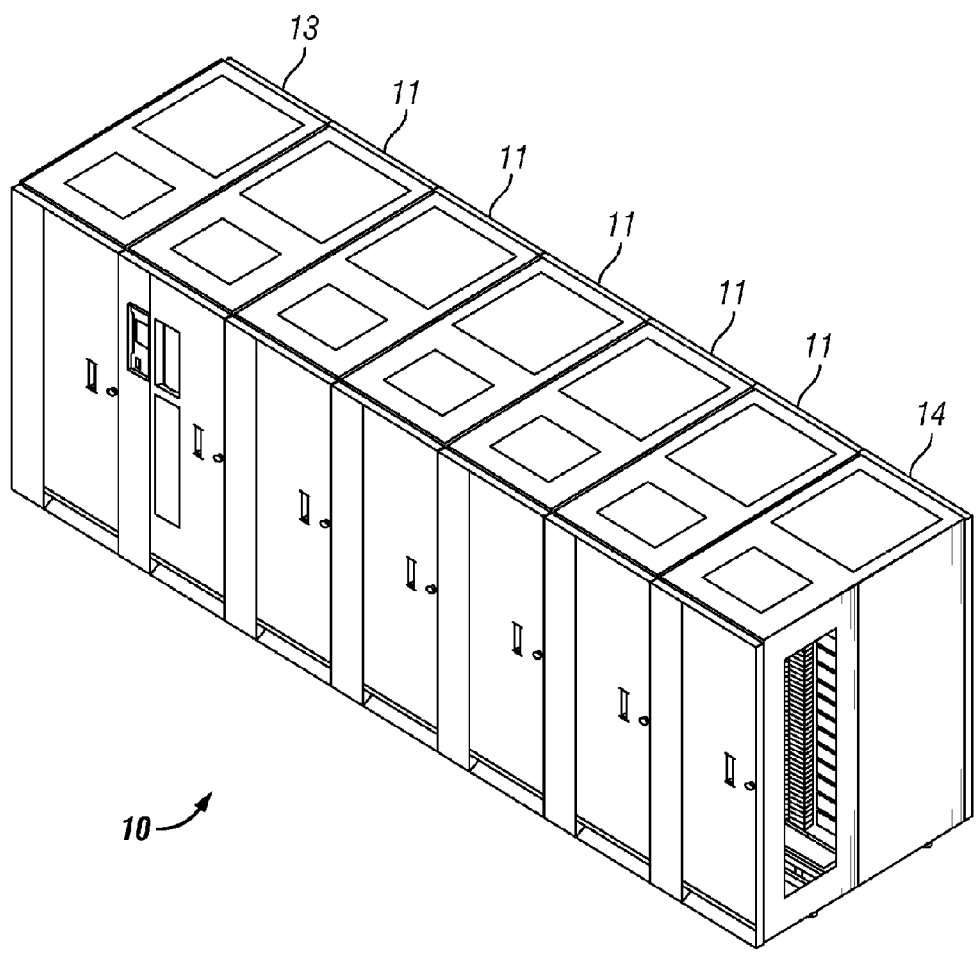
FIG. 1 is an isometric view of an automated data storage library implementing inventory management of data storage media in accordance with an embodiment of the present invention, with the view specifically depicting a library having a left hand service bay, multiple storage frames and a right hand service bay.

FIG. 1 illustrates an embodiment of an automated data storage library 10 employing aspects of the present description. As explained in greater detail below, the automated data storage library 10 of FIG. 1 has inventory management which facilitates taking an inventory of the removable media stored in the library 10 and identifying the physical location of each such removable media.

For example, in one aspect of the present description, the inventory management for an automated data storage library such as the library 10 can provide a more efficient inventory method which does not require every cartridge in the deep slots of an automated tape library to be moved. Thus, as explained in greater detail below, a subset of cartridges being inventoried in a particular cell may be returned to that particular cell without being transported to a different cell. It is noted that in some previous inventory methods of automated data storage libraries, every single cartridge may be moved as a part of the inventory process.

In another aspect, the inventory management for an automated data storage library such as the library 10 can preserve or maintain the tier order of the tape cartridges after the inventory is completed. Thus, as explained in greater detail below, each cartridge may be stored in a tier position which is the same or higher order than the tier position occupied by the cartridge prior to the inventory. It is noted that in some currently known inventory methods, the tier order of the cartridges may be reversed from the original tier order in place prior to the initiation of the inventory, such that some data storage media may be left in a lower order tier position upon completion of the inventory.

However, as described in U.S. Pat. Nos. 8,135,494 or 8,265,786 or 8,290,612 or 8,346,386, the locations of the tape cartridges are frequently intentionally arranged in a particular tier order in order to improve performance based on various algorithms such as the least recently used algorithms. Thus the tier order may be optimized over time as the robotic accessor moves tape cartridges to and from drives during normal library operation. As noted above, some currently known inventory methods can reverse the tier order of the cartridges such that the cartridges which were prior to the inventory the deepest cartridges, are left at the front of the deep slot at the end of the inventory. Conversely, the front cartridges at the beginning of the inventory are relocated to the deepest tier (a lower order tier) after the inventory. As explained in greater detail below, an inventory management in accordance with the present description can maintain the original tier depth of the tape cartridges which was in place prior to the inventory.

Various embodiments of an inventory management in accordance with the present description are presented. It will be appreciated by those skilled in the art that variations may be accomplished in view of these teachings without deviating from the spirit or scope of the description.

The inventory management of the present description is, in one embodiment, embodied in an automated magnetic tape library storage system for use in a data processing environment. Although the library embodiment shown uses magnetic tape cartridges, one skilled in the art will recognize that the inventory management of the present description equally applies to optical disk cartridges or other removable storage media and the use of either different types of cartridges or cartridges of the same type having different characteristics. Furthermore the description of an automated magnetic tape storage system is not meant to limit the inventory management to magnetic tape data processing applications as the description herein can be applied to any media storage and cartridge handling systems in general.

Figure 2:
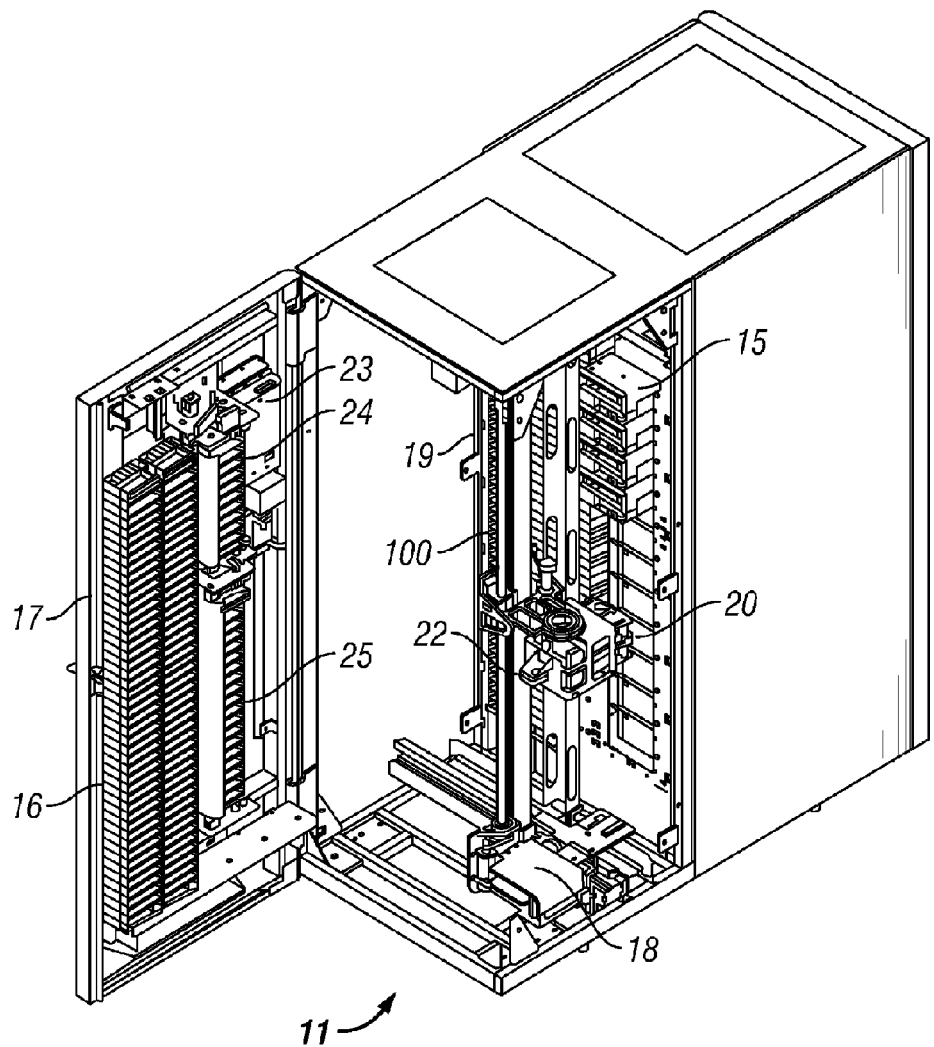
FIG. 2 is an isometric view of an automated data storage library implementing inventory management of data storage media in accordance with an embodiment of the present invention, with the view specifically depicting an exemplary basic configuration of the internal components of a library.

FIGS. 1 and 2 illustrate an automated data storage library 10 which stores and retrieves data storage cartridges containing data storage media (not shown) at multi-cartridge deep slot cells 100 and single cartridge storage slots 16. It is noted that references to "data storage media" herein refer to data storage cartridges, and for purposes herein the two terms are used synonymously. The IBM 3584 UltraScalable Tape Library is an example of an automated data storage library which may be adapted to employ inventory management in accordance with the present description, and has a general exterior and interior configuration as depicted in FIGS. 1 and 2.

The library of FIG. 1 comprises a left hand service bay 13, one or more storage frames 11, and right hand service bay 14. As will be discussed, a frame may comprise an expansion component of the library. Frames may be added or removed to expand or reduce the size and/or functionality of the library. Frames may comprise additional storage slots, deep slot cells, drives, import/export stations, accessors, operator panels, etc. FIG. 2 shows an example of a storage frame 11, which is the base frame of the library 10 and is contemplated to be the minimum configuration of the library. In this minimum configuration, there is only a single accessor (i.e., there are no redundant accessors) and there is no service bay. The library 10 is arranged for accessing data storage media in response to commands from at least one external host system (not shown), and comprises a plurality of storage slots 16 on front wall 17 and a plurality of multi-cartridge deep slot cells 100 on rear wall 19, both for storing data storage cartridges that contain data storage media. The storage slots 16 are configured to store a single data storage cartridge, and the multi-cartridge deep slot cells 100 are configured to store a plurality of data storage cartridges arranged in sequential order of tiers from front to rear.

The library also comprises at least one data storage drive 15 for reading and/or writing data with respect to the data storage media; and a first accessor 18 for transporting the data storage media between the plurality of storage slots 16, the multi-cartridge deep slot cells, and the data storage drive(s) 15. The data storage drives 15 may be optical disk drives or magnetic tape drives, or other types of data storage drives as are used to read and/or write data with respect to the data storage media.

The storage frame 11 may optionally comprise an operator panel 23 or other user interface, such as a web-based interface, which allows a user to interact with the library. The storage frame 11 may optionally comprise an upper input/output (I/O) station 24 and/or a lower I/O station 25, which allows data storage cartridges to be added to the library inventory and/or removed from the library without disrupting library operation. Herein, adding data storage cartridges to the library may also be called "inserting" data storage cartridges.

The library 10 may comprise one or more storage frames 11, each having storage slots 16 accessible by first accessor 18. As described above, the storage frames 11 may be configured with different components depending upon the intended function. One configuration of storage frame 11 may comprise storage slots 16 and/or multi-cartridge deep slot cells 100, data storage drive(s) 15, and other optional components to store and retrieve data from the data storage cartridges, and another storage frame 11 may comprise storage slots 16 and/or multi-cartridge deep slot cells 100 and no other components. The first accessor 18 comprises a gripper assembly 20 for gripping one or more data storage media and may include a bar code scanner 22 or other reading system, such as a cartridge memory reader or similar system, mounted on the gripper 20, to "read" identifying information about the data storage media.

Figure 3:
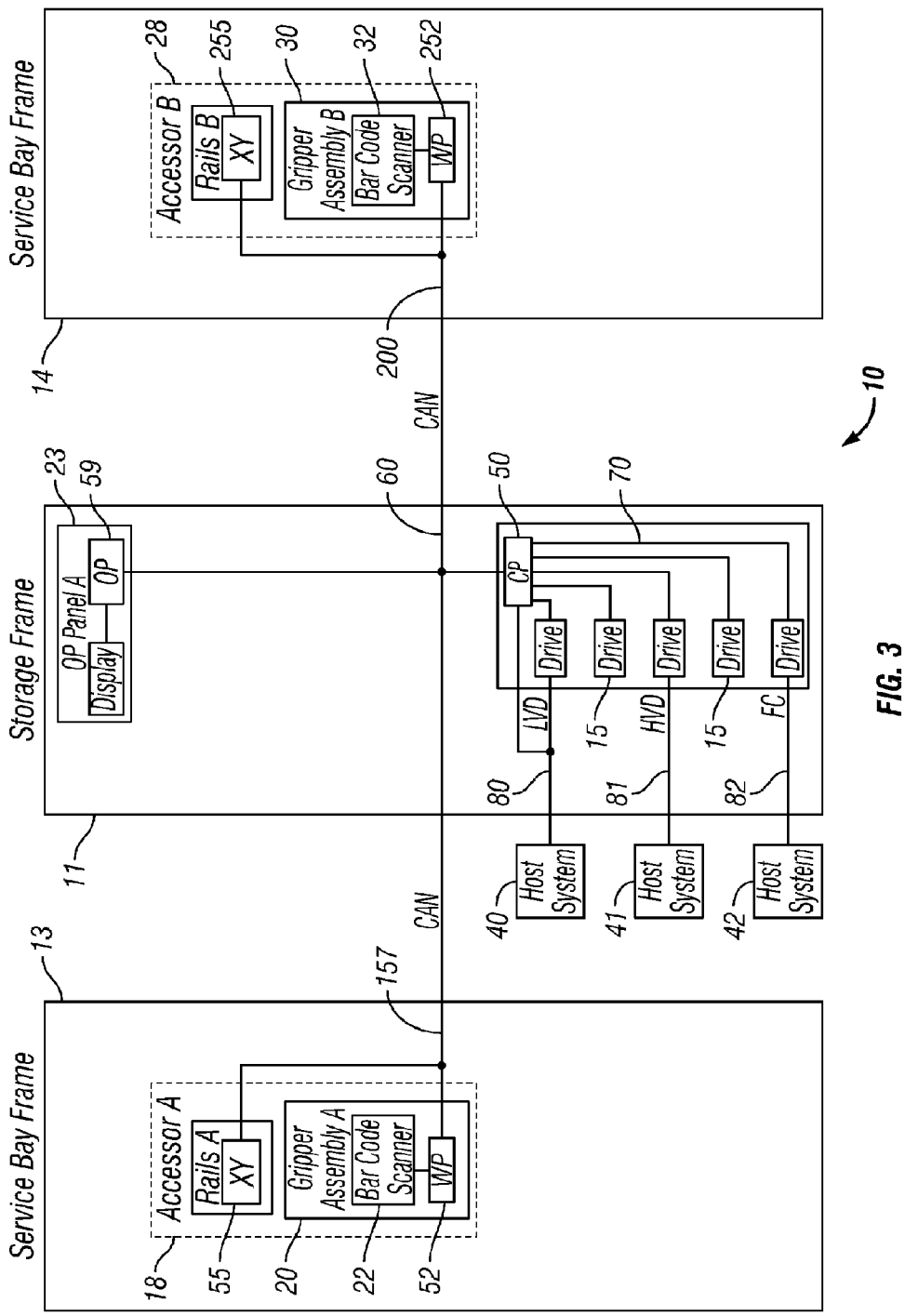
FIG. 3 is a block diagram of an automated data storage library implementing inventory management of data storage media in accordance with an embodiment of the present invention, with the diagram specifically depicting a library that employs a distributed system of modules with a plurality of processor nodes.

FIG. 3 illustrates an embodiment of an automated data storage library 10 of FIGS. 1 and 2, which employs a controller arranged as a distributed system of modules with a plurality of processor nodes. The IBM 3584 UltraScalable Tape Library is an example of an automated data storage library having a distributed system which may be adapted to implement inventory management in accordance with the present description. While one embodiment of the automated data storage library 10 has been described as employing a distributed control system, inventory management in accordance with the present description may be implemented in automated data storage libraries regardless of control configuration, such as, but not limited to, an automated data storage library having one or more library controllers that are not distributed, as that term is defined in U.S. Pat. No. 6,356,803.

The library of FIG. 3 comprises one or more storage frames 11, a left hand service bay 13 and a right hand service bay 14. The left hand service bay 13 is shown with a first accessor 18. As discussed above, the first accessor 18 comprises a gripper assembly 20 and may include a reading system 22 to "read" identifying information about the data storage media. The right hand service bay 14 is shown with a second accessor 28. The second accessor 28 comprises a gripper assembly 30 and may include a reading system 32 to "read" identifying information about the data storage media.

In the event of a failure or other unavailability of the first accessor 18, or its gripper 20, etc., the second accessor 28 may perform some or all of the functions of the first accessor 18. The two accessors 18, 28 may share one or more mechanical paths or they may comprise completely independent mechanical paths. In one example, the accessors 18, 28 may have a common horizontal rail with independent vertical rails. The first accessor 18 and the second accessor 28 are described as first and second for descriptive purposes only and this description is not meant to limit either accessor to an association with either the left hand service bay 13, or the right hand service bay 14. In the exemplary library, first accessor 18 and second accessor 28 move their grippers in at least two directions, called the horizontal "X" direction and vertical "Y" direction, to retrieve and grip, or to deliver and release the data storage cartridge at the storage slots 16 and multi-cartridge deep slot cells 100, and to load and unload the data storage cartridge at the data storage drives 15.

The exemplary library 10 receives commands from one or more host systems 40, 41 or 42. The host systems, such as host servers, communicate with the library directly, e.g., on path 80, through one or more control ports (not shown), or through one or more data storage drives 15 on paths 81, 82, providing commands to access particular data storage cartridges and move the cartridges, for example, between the storage slots 16 and the data storage drives 15. The commands are typically logical commands identifying the cartridges or cartridge media and/or logical locations for accessing the media. The terms "commands" and "work requests" are used interchangeably herein to refer to such communications from the host system 40, 41 or 42 to the library 10 as are intended to result in accessing particular data storage media within the library 10.

The exemplary library is controlled by a library controller, which in one embodiment comprises a distributed control system receiving the logical commands from hosts, determining the required actions, and converting the actions to physical movements of first accessor 18 and/or second accessor 28. In the exemplary library, the distributed control system comprises a plurality of processor nodes, each having one or more computer processors. In one example of a distributed control system, a communication processor node 50 may be located in a storage frame 11.

The communication processor node provides a communication link for receiving the host commands, either directly or through the drives 15, via at least one external interface, e.g., coupled to line 80. The communication processor node 50 may additionally provide a communication link 70 for communicating with the data storage drives 15. The communication processor node 50 may be located in the frame 11, close to the data storage drives 15. Additionally, in an example of a distributed processor system, one or more additional work processor nodes are provided, which may comprise, e.g., a work processor node 52 that may be located at first accessor 18, and that is coupled to the communication processor node 50 via a network 60, 157. Each work processor node may respond to received commands that are broadcast to the work processor nodes from any communication processor node, and the work processor nodes may also direct the operation of the accessors, providing move commands.

An XY processor node 55 may be provided and may be located at an XY system of first accessor 18. The XY processor node 55 is coupled to the network 60, 157, and is responsive to the move commands, operating the XY system to position the gripper 20. Also, an operator panel processor node 59 may be provided at the optional operator panel 23 for providing an interface for communicating between the operator panel and the communication processor node 50, the work processor nodes 52, 252, and the XY processor nodes 55, 255.

A network, for example comprising a common bus 60, is provided, coupling the various processor nodes. The network may comprise a robust wiring network, such as the commercially available CAN (Controller Area Network) bus system, which is a multi-drop network, having a standard access protocol and wiring standards, for example, as defined by CiA, the CAN in Automation Association, Amweich Selgarten 26, D-9 1 05 8 Erlangen, Germany. Other networks, such as Ethernet, or a wireless network system, such as RF or infrared, may be employed in the library as is known to those of skill in the art. In addition, multiple independent networks may also be used to couple the various processor nodes.

The communication processor node 50 is coupled to each of the data storage drives 15 of a storage frame 11, via lines 70, communicating with the drives and with host systems 40, 41 and 42. Alternatively, the host systems may be directly coupled to the communication processor node 50, at input 80 for example, or to control port devices (not shown) which connect the library to the host system(s) with a library interface similar to the drive/library interface. As is known to those of skill in the art, various communication arrangements may be employed for communication with the hosts and with the data storage drives. In the example of FIG. 3, host connections 80 and 81 are SCSI busses.

Bus 82 comprises an example of a Fibre Channel bus which is a high speed serial data interface, allowing transmission over greater distances than the SCSI bus systems. The data storage drives 15 may be in close proximity to the communication processor node 50, and may employ a short distance communication scheme, such as SCSI, or a serial connection, such as RS-422. The data storage drives 15 are thus individually coupled to the communication processor node 50 by means of lines 70. Alternatively, the data storage drives 15 may be coupled to the communication processor node 50 through one or more networks, such as a common bus network. Additional storage frames 11 may be provided and each is coupled to the adjacent storage frame. Any of the storage frames 11 may comprise communication processor nodes 50, storage slots 16, data storage drives 15, and networks 60.

Further, as described above, the automated data storage library 10 may comprise a plurality of accessors. A second accessor 28, for example, is shown in a right hand service bay 14 of FIG. 3. The second accessor 28 may comprise a gripper 30 for accessing the data storage media, and an XY system 255 for moving the second accessor 28. The second accessor 28 may run on the same horizontal mechanical path as first accessor 18, or on an adjacent path. The exemplary control system additionally comprises an extension network 200 forming a network coupled to network 60 of the storage frame(s) 11 and to the network 157 of left hand service bay 13.

In FIG. 3 and the accompanying description, the first and second accessors are associated with the left hand service bay 13 and the right hand service bay 14 respectively. This is for illustrative purposes and there may not be an actual association. In addition, network 157 may not be associated with the left hand service bay 13 and network 200 may not be associated with the right hand service bay 14. Depending on the design of the library, it may not be necessary to have a left hand service bay 13 and/or a right hand service bay 14.

An automated data storage library 10 typically comprises one or more controllers to direct the operation of the automated data storage library. Host computers and data storage drives typically comprise similar controllers. A library controller may take many different forms and may comprise, for example but not limited to, an embedded system, a distributed control system, a personal computer, or a workstation. Essentially, the term "library controller" as used herein is intended in its broadest sense as a device that contains at least one computer processor, as such term is defined herein.

Figure 4:
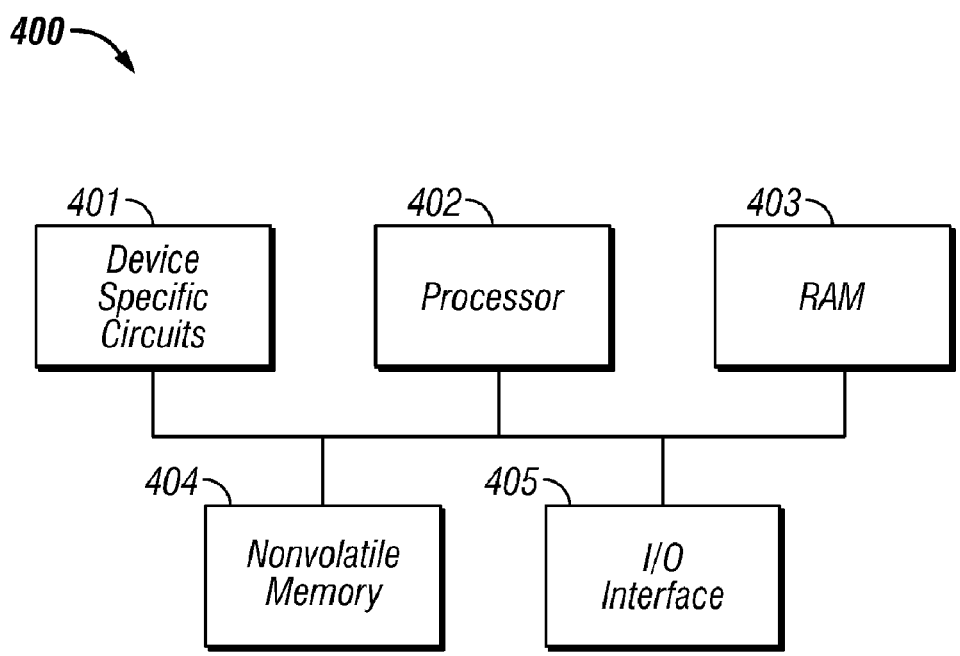
FIG. 4 is a block diagram depicting an exemplary controller configuration for inventory management of data storage media in accordance one embodiment of the present description.

FIG. 4 shows an example of a library controller 400 which may be modified to provide inventory management in accordance with the present description. The controller 400 includes a processor 402, RAM (Random Access Memory) 403, nonvolatile memory 404, device specific circuits 401, and I/O interface 405. Alternatively, the RAM 403 and/or nonvolatile memory 404 may be contained in the processor 402 as could the device specific circuits 401 and I/O interface 405.

The processor 402 may comprise, for example, an off-the-shelf microprocessor, custom processor, FPGA (Field Programmable Gate Array), ASIC (Application Specific Integrated Circuit), discrete logic, or the like. The RAM (Random Access Memory) 403 is typically used to hold variable data, stack data, executable instructions, and the like. The nonvolatile memory 404 may comprise any type of nonvolatile memory such as, but not limited to, EEPROM (Electrically Erasable Programmable Read Only Memory), flash PROM (Programmable Read Only Memory), battery backup RAM, and hard disk drives. The nonvolatile memory 404 is typically used to hold the executable firmware and any nonvolatile data. The I/O interface 405 comprises a communication interface that allows the processor 402 to communicate with devices external to the controller. Examples may comprise, but are not limited to, serial interfaces such as RS-232, USB (Universal Serial Bus) or SCSI (Small Computer Systems Interface).

The device specific circuits 401 provide additional hardware to enable the controller 400 to perform unique functions such as, but not limited to, motor control of a cartridge gripper. The device specific circuits 401 may comprise electronics that provide, by way of example but not limitation, Pulse width Modulation (PWM) control, Analog to Digital Conversion (ADC), Digital to Analog Conversion (DAC), etc. In addition, all or part of the device specific circuits 401 may reside outside the controller 400. while the automated data storage library 10 is described as employing a distributed control system, the present invention may be implemented in various automated data storage libraries regardless of control configuration, such as, but not limited to, an automated data storage library having one or more library controllers that are not distributed.

A library controller may comprise one or more dedicated controllers. For example, there may be a primary controller and a backup controller. In addition, a library controller may comprise one or more processor nodes of a distributed control system. For example, communication processor node 50 (FIG. 3) may comprise the library controller while the other processor nodes (if present) may assist the library controller and/or may provide backup or redundant functionality. In another example, communication processor node 50 and work processor node 52 may work cooperatively to comprise the library controller while the other processor nodes (if present) may assist the library controller and/or may provide backup or redundant functionality. Still further, all of the processor nodes may comprise the library controller. Herein, library controller may comprise a single processor or controller or it may comprise multiple processors or controllers.

Figure 5A:
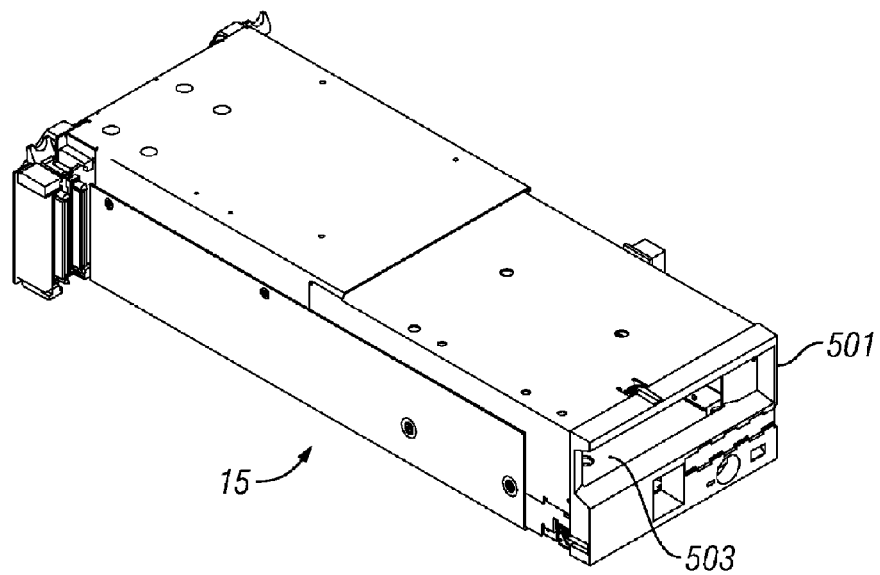
FIGS. 5A and 5B are isometric views of the front and rear, respectively, of a data storage drive of the automated data storage library of FIGS. 1, 2 and 3.
Figure 5B:
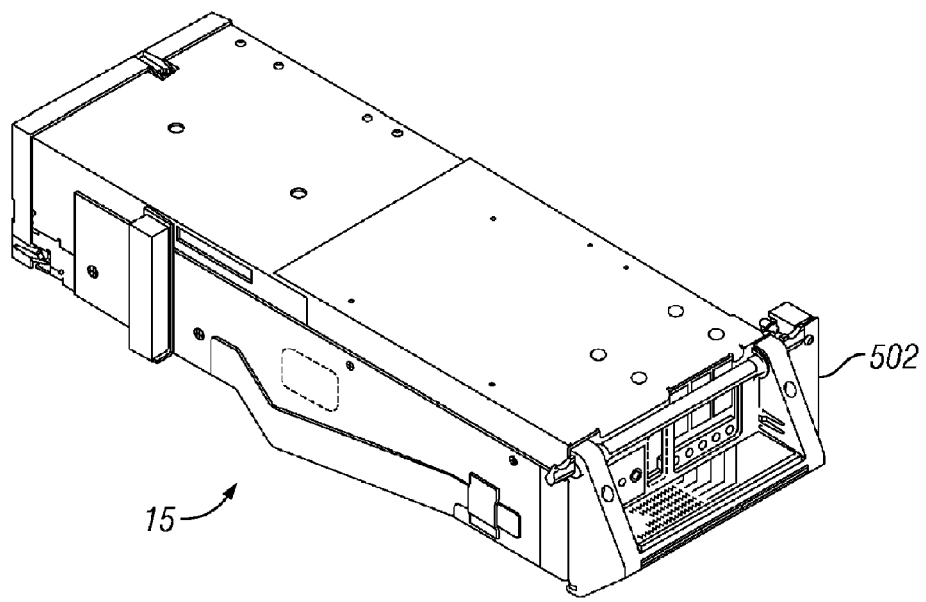

FIGS. 5A and 5B illustrate an embodiment of the front 501 and rear 502 of a data storage drive 15. In the example, the data storage drive 15 comprises a hot-swap drive canister. This is only an example and is not meant to limit the invention to hot-swap drive canisters. In fact, any configuration of data storage drive may be used whether or not it comprises a hot-swap canister. A data storage cartridge may be placed into the data storage drive 15 at opening 503. As discussed above, a data storage drive 15 is used to read and/or write data with respect to the data storage media, and may additionally communicate with a memory which is separate from the media and is located within the cartridge.

Figure 6A:
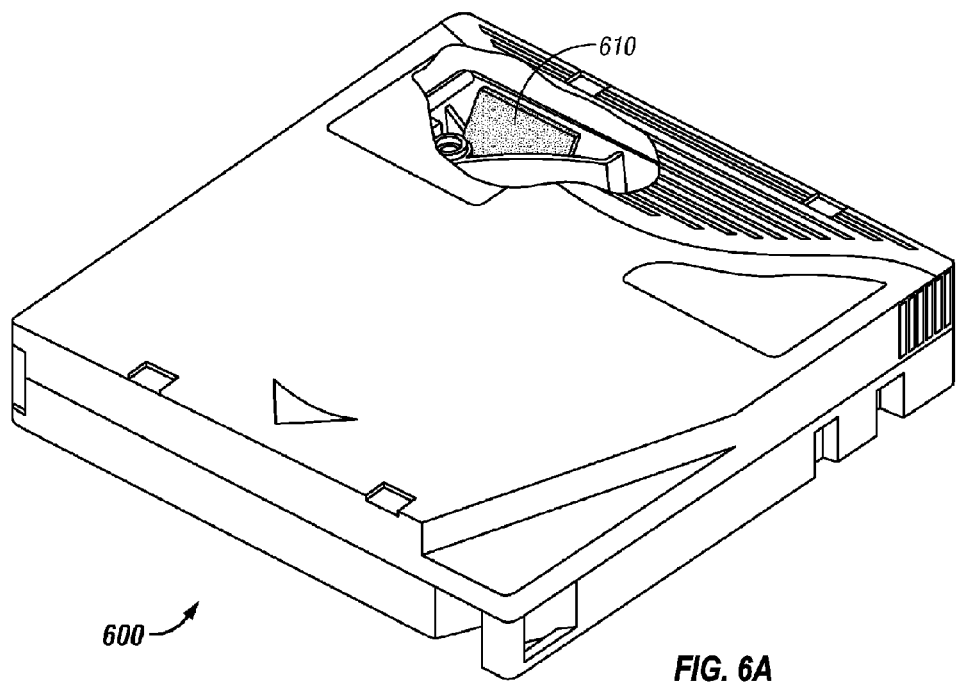
FIGS. 6A and 6B are an isometric view and a front view, respectively, of a data storage cartridge which may be stored by the automated data storage library of FIGS. 1, 2 and 3.
Figure 6B:
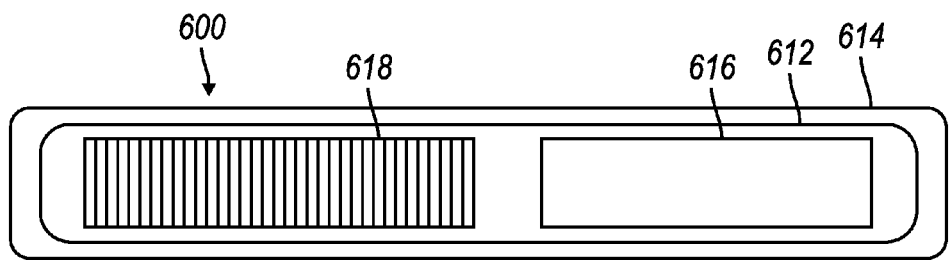

FIGS. 6A and 6B illustrate an embodiment of a data storage cartridge 600 with a cartridge memory 610 shown in a cutaway portion of the Figure. This is only an example and is not meant to limit the invention to cartridge memories. In fact, any configuration of data storage cartridge may be used whether or not it comprises a cartridge memory. Media of the data storage cartridge media may comprise any type of media on which data may be stored, including but not limited to magnetic media (such as magnetic tape or disks), optical media (such as optical tape or disks), electronic media (such as PROM, EEPROM, flash PROM, CompactFlash™, Smartmedia™, Memory Stick™, etc.), or other suitable media. An example of a data storage cartridge that is widely employed in automated data storage libraries for mass data storage is a magnetic tape cartridge in which the media is magnetic tape.

In the illustrated embodiment, the data storage cartridge 600 also has a label 612 carried on one face of the housing 614 of the cartridge 600. The label 612 bears identifying indicia 616, 618 which may be read by a suitable optical scanner such as the bar code scanner 22 of the accessor 18 and gripper assembly 20. Thus, in one embodiment, the identifying indicia 616, 618 may include a bar code and alpha numeric characters representing a serial number for example, which has been assigned to the cartridge 600. It is appreciated that identifying information may be stored in forms other than optical indicia such as in a memory circuit or other devices which may be read by various types of scanners such as RFID scanners, for example, depending upon the particular application.

Figure 7A:
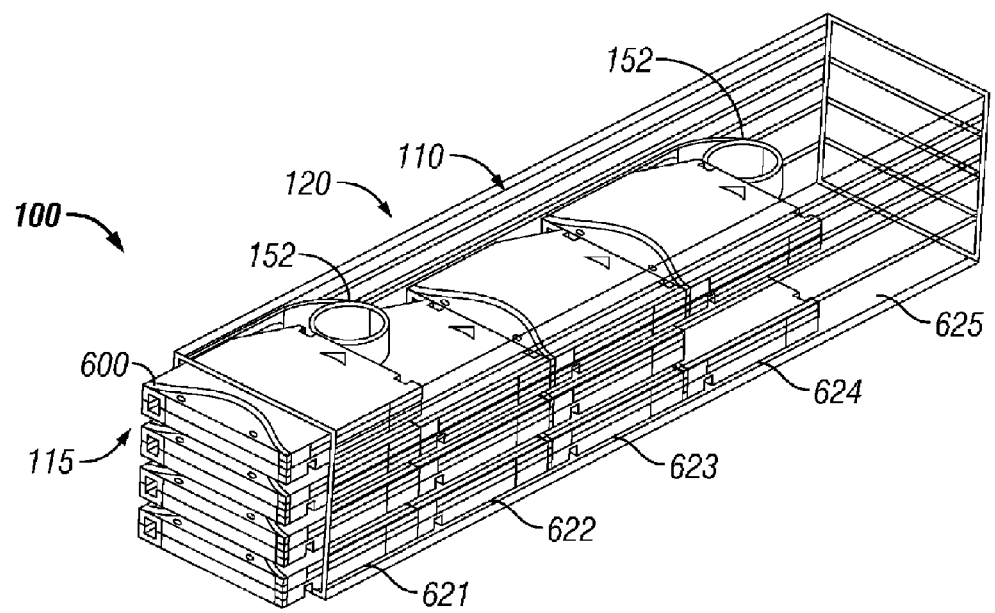
FIGS. 7A, 7B illustrate one embodiment of a multi-cartridge deep slot cell of the automated data storage library of FIGS. 1, 2 and 3.
Figure 7B:
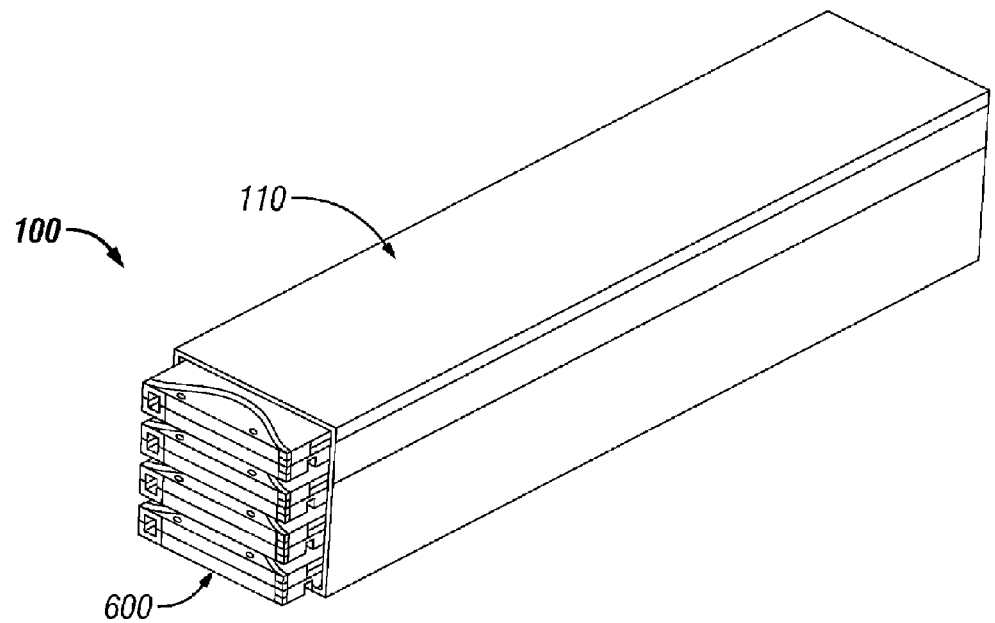

FIGS. 7A and 7B illustrate one embodiment of a multi cartridge deep slot cell 100 that may be employed in accordance with the present invention, and FIGS. 8A, 8B, 8C and 8D illustrate an embodiment of a retaining gate cartridge blocking mechanism 150 that retains the data storage cartridges in the multi-cartridge deep slot cell 100. Multi-cartridge deep slot cell 100 comprises a housing 110 defining an interior space 115. A plurality of storage slots 120 are disposed within the housing, and are, in one embodiment, configured for storing up to a plurality of data storage cartridges 600. Alternatively, the multi-cartridge deep slot cell 100 is built into the frame of the automated data storage library.

In one embodiment, the retaining gate is externally attached to a multi-cartridge deep slot cell 100 relative to a front opening of the multi-cartridge deep slot cell 100 whereby the retaining gate can be activated by an accessor of an automated tape library. The retaining gate allows for positive cartridge retention against the pressure of biasing springs 152, and ensures that one or more data storage cartridges do not get pushed out of the multi-cartridge deep slot cell 100 simultaneously while allowing the pushing mechanism of the multi-cartridge deep slot cell 100 to always push the data storage cartridge(s) to the opening in a multi-cartridge deep slot cell 100.

The accessor opens the retaining gate to gain access to the data storage cartridge in tier 1 and, upon its extraction, the biasing spring 152 moves the cartridge(s) behind the extracted cartridge forward, promoting the cartridge(s) by one tier. The basic working of the retaining gate is that the gate prevents the data storage cartridge(s) from being pushed out of a multi-cartridge deep slot cell 100.

Figure 8A:
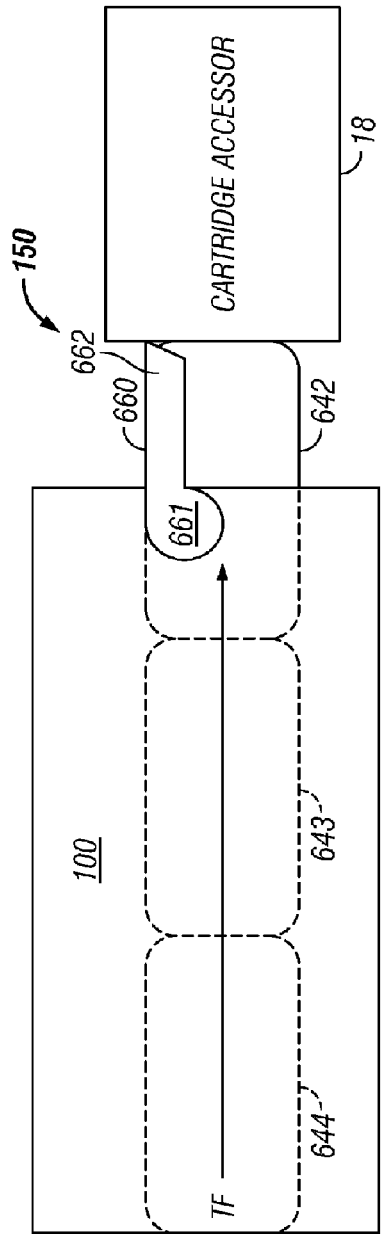

For example, as shown in FIGS. 8A, 8B, 8C and 8D, a retaining gate 660 can be lifted by, for example, accessor 18 or by a front cartridge 642 for cartridge removal from/insertion into a multi-cartridge deep slot cell 100. Specifically, retaining gate 660 has a pivoting arm 661 mounted on multi-cartridge deep slot cell 100 via a pivoting post (not shown) that can be integral to a construction of multi-cartridge deep slot cell 100. Pivoting arm 661 is located below a catch 662 of retaining gate 660 whereby a thrust force TF through data storage cartridge 644-642 by the pushing mechanism (not shown) of multi-cartridge deep slot cell 100 causes retaining gate 660 to stay closed in a retaining position as shown in FIG. 8A. Retaining gate 660 is biased such that it closes in the downward direction over the front opening of multi-cartridge deep slot cell 100. This constant biasing can be done by gravity as shown in FIG. 8A or by a spring force attached to retaining gate 660 (not shown).

For removal of front tape cartridge 642 by accessor 18 from multi-cartridge deep slot cell 100, retaining gate 660 is lifted upward to a releasing position whereby catch 662 of retaining gate 660 is disengaged from front storage cartridge 642. This can be seen in FIG. 8B where accessor 18 interfaces with retaining gate 660 by providing a lifting force. Once retaining gate 660 is lifted to the releasing position and accessor 18 is engaged with storage cartridge 642, accessor 18 can pull storage cartridge 642 out of multi-cartridge deep slot cell 100 and into accessor 18 without any interference of retaining gate 660 as shown in FIG. 8C.

Figure 8B:
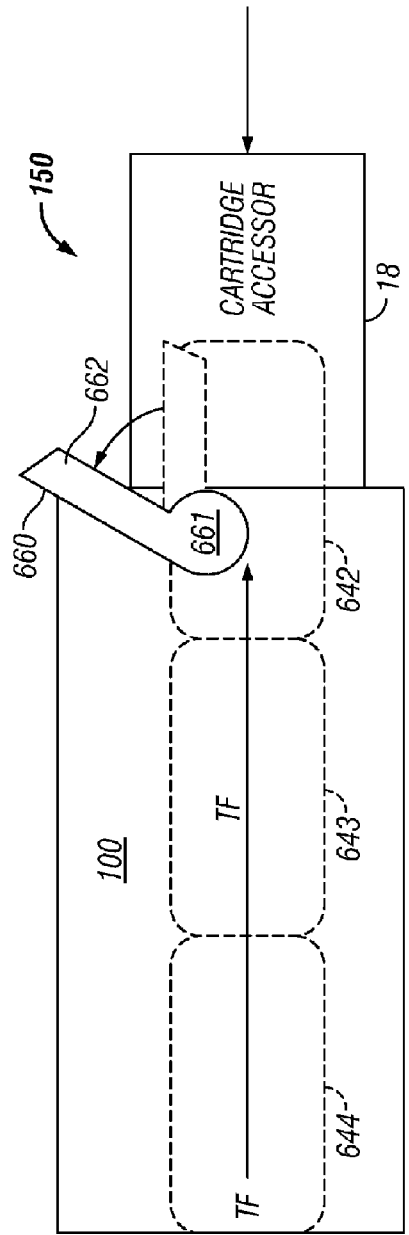

In view of storage cartridges 644 and 643 being stored in multi-cartridge deep slot cell 100, retaining gate 660 must return to its retaining position to prevent storage cartridges 644 and 643 from being ejected from multi-cartridge deep slot cell 100 by the pushing mechanism. During extraction of front tape cartridge 642 through the front opening of multi-cartridge deep slot cell 100, retaining gate 660 which is being biased downward moves back to the retaining position to engage storage cartridge 643. Once front tape cartridge 642 is extracted and storage cartridges 643 and 644 are retained from being pushed out of multi-cartridge deep slot cell 100, retaining gate 660 has successfully completed its cartridge retrieval process. Now retaining gate 660 must demonstrate an ability to work for cartridge insertion into multi-cartridge deep slot cell 100. when accessor 18 begins to insert storage cartridge 642 back into multi-cartridge deep slot cell 100, retaining gate 660 must be lifted to its releasing position in order to allow storage cartridge 642 through the front opening of multi-cartridge deep slot cell 100. Catch 662 of retaining gate 660 interfaces with a rear portion of storage cartridge 642, in particular a beveled surface of catch 662 as shown in FIG. 8D, whereby retaining gate 660 is lifted to its releasing position as shown in FIG. 8B due to storage cartridge 642 being pushed in multi cartridge deep slot cell 100 by accessor 18. In doing this operation, storage cartridges 644 and 643 are pushed deeper into multi-cartridge deep slot cell 100 by storage cartridge 642 in multi-cartridge deep slot cell 100 by accessor 18. Upon full insertion into multi-cartridge deep slot cell 100, retaining gate 660 moves to its retaining position to engage storage cartridge 642 as shown in FIG. 8A.

Access to a storage slot may include the ability to remove a cartridge from a storage slot, the ability to place a cartridge into a storage slot, or combinations thereof. In this example, the storage slots from top to bottom are considered to be in parallel and comprise the same tier. The storage slots from front to back, in one particular row, are considered to be in series and comprise sequential tiers. Storage slots 120 are, in one embodiment, configured for storing up to a plurality of data storage cartridges 600, arranged in sequential order of tiers 621, 622, 623, 624 and 625 from front to rear. Herein, the frontmost tier 621 is also called "tier 1", the next tier 622 is called "tier 2", etc., and the last tier 625 is also called the "rearmost" tier.

The tier positions may be ranked in rank order from front to back with the frontmost tier position tier 1 having the highest rank, and the rearmost tier position having the lowest rank. Thus, tier 1 has a higher tier rank than tier 2, tier 2 has a higher tier rank than tier 3, etc. Referring to FIG. 2, in one embodiment, the single cartridge storage slots 16 are also termed "tier 0".

As previously mentioned, in one aspect of the present description, the inventory management for an automated data storage library such as the library 10 can preserve or maintain the tier order of the tape cartridges after the inventory is completed. As used herein, the tier order of the tape cartridges is considered to be preserved or maintained if the tier position of a particular cartridge is the same as or of a higher tier order after the inventory is completed, as compared to the original tier order for that particular cartridge when the inventory was initiated.

Referring to FIGS. 1, 2 and 3, in one embodiment, the controller of automated data storage library 10 operates the accessor(s) 18, 28 to selectively extract, place and transport data storage cartridges with respect to the multi-cartridge deep slot cells 100 and with respect to other elements of the automated data storage library, for example, extracting a cartridge from a multi-cartridge deep slot cell 100, transporting the cartridge to a data storage drive 15 and placing the cartridge in the drive. The controller may then extract the cartridge from the data storage drive 15, and the controller will direct the accessor to transport the cartridge to a specific multi-cartridge deep slot cell 100, and place the cartridge in the specific multi-cartridge deep slot cell. In one embodiment, one or more data storage cartridges may be added (also called inserted) into the library, for example, at an I/O station 24, 25. The controller of automated data storage library 10 operates the accessor(s) 18, 28 to transport the cartridge(s) to specific multi-cartridge deep slot cell(s) 100, and place the cartridge(s) in the specific multi cartridge deep slot cell(s). Similarly, the controller may also operate the accessor(s) to selectively extract, place and transport data storage cartridges with respect to the single cartridge storage slots 16, and to transport inserted or added cartridge(s) to specific single cartridge storage slots 16.

As previously mentioned, in one aspect of the present description, tier order preserving inventory management is provided for an automated data storage library such as the library 10, which can preserve or maintain the original tier order of the tape cartridges after the inventory is completed. As a consequence, upon completion of the inventory, each cartridge may have a tier position which is the same as its original tier position, or in some cases, a tier position which is of a higher order (that is, closer to the front of a cell) than its original tier position prior to initiation of the inventory.

In another aspect, the inventory management for an automated data storage library such as the library 10 can provide a more efficient inventory method which does not require every cartridge in the deep slots of an automated tape library to be moved. As a consequence, the inventory may, in some embodiments, be performed more quickly and efficiently.

Figure 9:
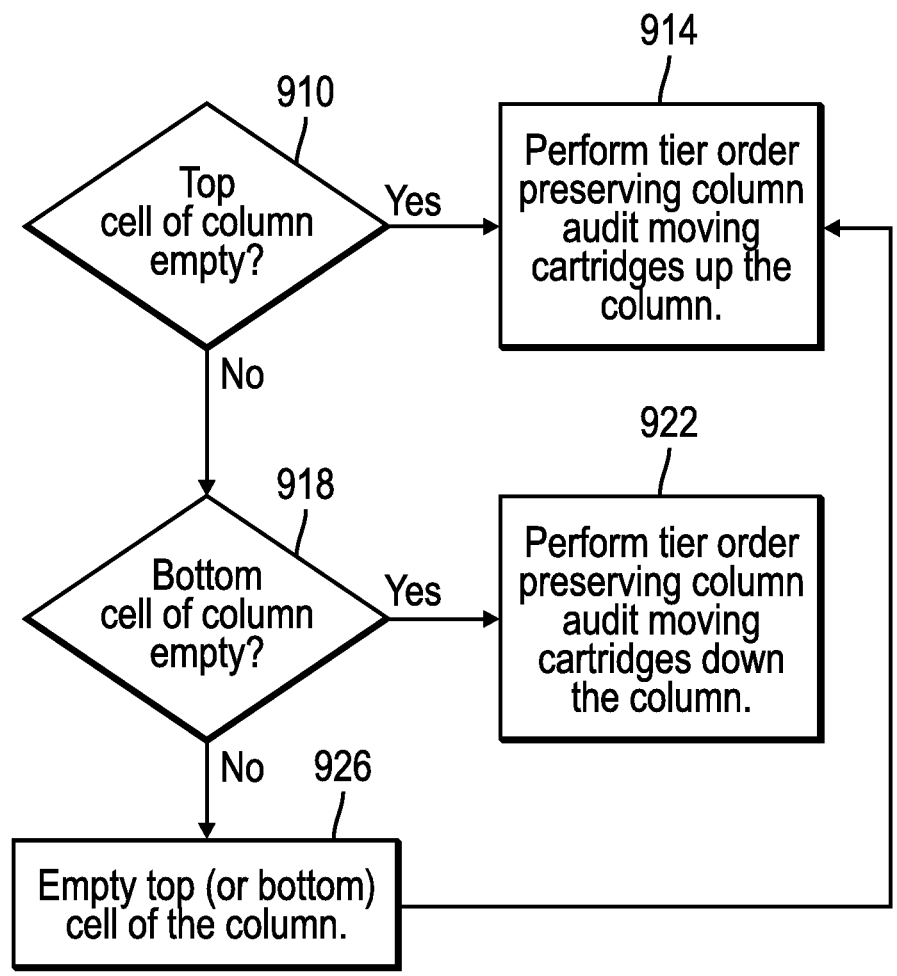
FIG. 9 illustrates one embodiment of operations for inventory management of data storage media in accordance with one aspect of the present description.

FIG. 9 illustrates one embodiment of operations of a library controller, such as the controller 400 (FIG. 4), for example, for performing tier order preserving inventory management in accordance with one aspect of the present description. In this embodiment, one column of cells is audited or inventoried at a time, in a tier order preserving column audit which either moves or transports a subset of cartridges up or down in the column to destination cells, depending upon the location of an initially empty transport destination cell in the column. Thus, in one operation, a check is made (block 910) by a library controller to determine if the top cell of a column to be audited or inventoried is empty. Such a determination may be made by positioning an accessor such as the accessor 18 in front of the cell and scanning the cell to see if a cartridge is in the cell. If determined to be empty by the scanner not detecting a cartridge label, the top cell is designated the initially empty transport destination cell in the column, and a tier order preserving column audit (block 914) is initiated in which cartridges are moved up the column. It is appreciated that a variety of techniques may be employed to determine or verify that a cell is empty, that is, does not contain any cartridges.

Alternatively, if it is determined (block 910) that the top cell of a column to be audited or inventoried is not empty, a further determination (block 918) is made as to whether the bottom cell of a column to be audited or inventoried is empty. If so, the bottom cell is designated the initially empty transport destination cell in the column, and a tier order preserving column audit (block 922) is initiated in which cartridges are moved or transported down the column.

If it is determined (blocks 910, 918) that neither the top nor the bottom cell of a column to be audited or inventoried is empty, the top cell (or bottom cell) is emptied (block 926) in a process similar to that described in greater detail in connection with FIG. 10, and the appropriate tier order preserving column audit (block 914, 922) is performed. Upon completion of a tier order preserving column audit (block 914, 922) for a particular column of cells of the array of cells of the automated library, the operations of FIG. 9 are repeated until all columns of the library have been inventoried.

In one embodiment, the tier order preserving column audit is initiated using a destination cell which is completely empty of cartridges. However, it is appreciated that other embodiments may be initiated using a destination cell which is only partially empty such as a multi-cartridge deep slot cell in which some but not all slots are occupied by a cartridge.

In one embodiment, the tier order preserving inventory management may be initiated with a single cell which is empty or at least partially empty in the column to be inventoried. In other embodiments, more than one cell which is at least partially empty may be utilized to initiate the tier order preserving inventory process for a column. Thus, the process depicted in FIG. 9 may be modified such that the operations of blocks 910, 918 may be modified to check as to whether the top two or bottom two cells, respectively, of the column to be audited, are empty. In other embodiments, a column audit may be initiated with more than two top (or bottom cells) empty.

In the illustrated embodiment, the column audit is initiated with one or more cells at the top or bottom of the column being empty. However, it is appreciated that in other embodiments, a column audit in accordance with the present description may be initiated with a fully or partially empty initial destination cell located in a position intermediate to the top or bottom of the column to be audited. In such embodiments, tier order preserving column audits would move some cartridges up the column and other cartridges down the column.

Figure 10:
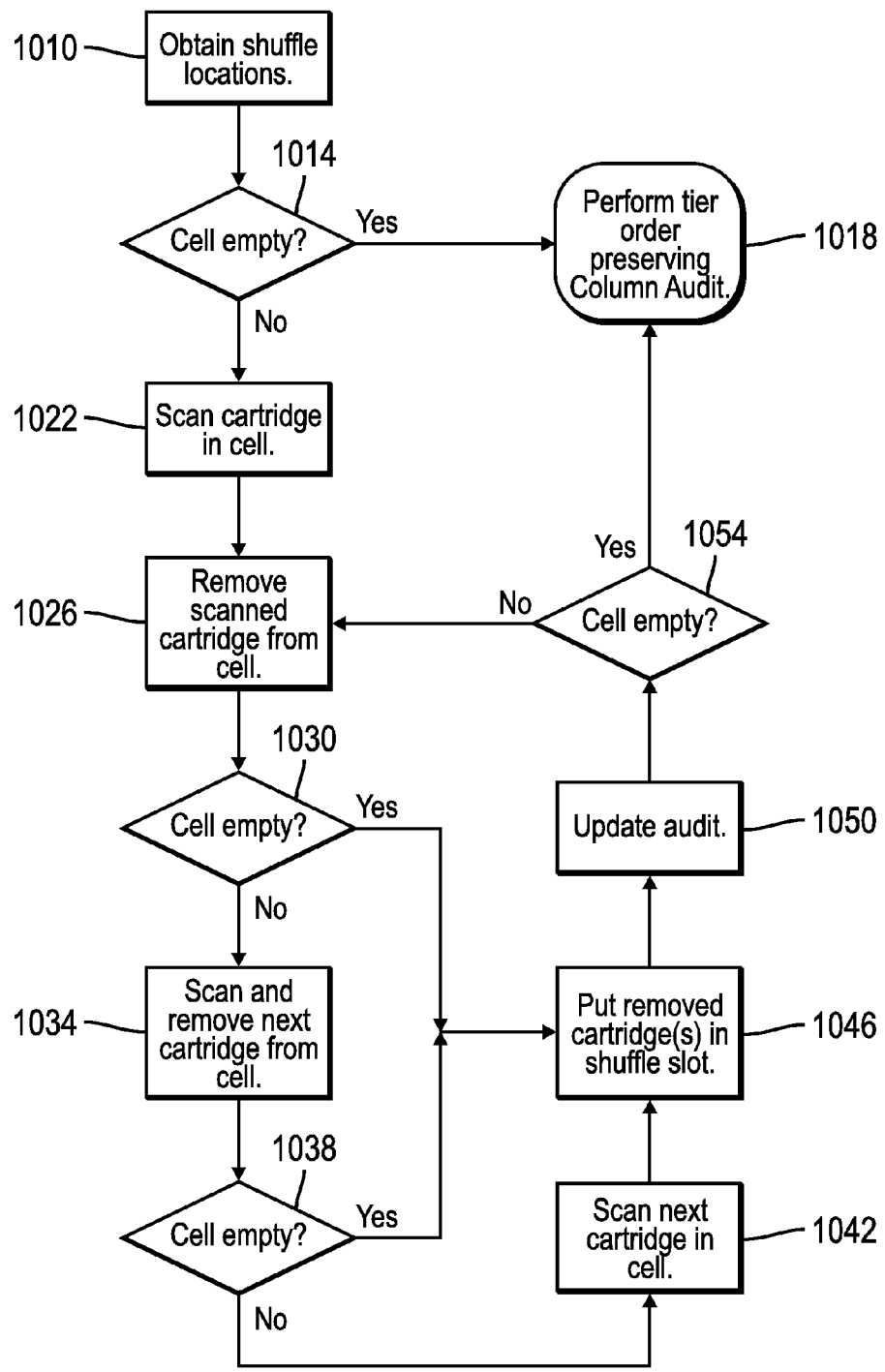
FIG. 10 illustrates another embodiment of operations for inventory management of data storage media in accordance with one aspect of the present description.

FIG. 10 illustrates one example of operations by the library controller 400 for emptying a single cell which is to be designated the initial destination cell of a column to be audited. The cell to be emptied and designated the initial destination cell may be located at the top of the column or may be located at the bottom of the column or at an intermediate location as previously described.

In this example, the cell to be emptied has five slots and is full, that is, contains five cartridges. It is recognized that in other embodiments, the cell may have more or fewer slots and more or fewer cartridges.

In a first operation, shuffle locations are obtained (block 1010) to accommodate the cartridges to be extracted from the cell. A shuffle location may be an empty location which may accommodate one or more cartridges, either temporarily or on a more long term basis. A determination (block 1014) is made as to whether the cell is empty as described above. If so, the empty cell is designated the initially empty transport destination cell in the column, and a tier order preserving column audit (block 1018) is initiated. If the designated destination cell is the top cell of the column, a tier order preserving column audit is initiated in which cartridges are moved up the column in a manner similar to the column audit 914 of FIG. 9. Conversely, if the designated destination cell is the bottom cell of the column, a tier order preserving column audit is initiated in which cartridges are moved down the column in a manner similar to the column audit 922 of FIG. 9.

If the cell is determined (block 1014) to not be empty, the front-most cartridge in 621 is scanned (block 1022) by the accessor 18 and is removed or extracted (block 1026) from the cell by the accessor 18 using its gripper assembly 20. If the cell is again determined (block 1030) to not be empty, the front-most cartridge which has moved up to tier 1 is scanned and is removed or extracted (block 1034) from the cell. In this example, the first and second cartridges of the five cartridges originally located in the cell have been removed at this point.

If the cell is again determined (block 1038) to not be empty, the front-most cartridge which is the third cartridge in this example, has moved up to the tier 1 position and is scanned (block 1042). The removed cartridges (the original first and second cartridges in this example) are transported (block 1046) to the available shuffle slot or slots, depending upon how many cartridges were removed. A data structure containing a record of the identity and location of each cartridge in the library, referred to herein as the "cartridge audit" is updated (block 1050) to indicate the new locations of the removed first and second cartridges.

In the illustrated embodiment, the accessor 18 is capable of holding two cartridges at a time and transporting them at the same time to the shuffle locations. In addition, the cartridges may be extracted from a cell in a particular order, such as the first cartridge first and the second cartridge second, transported to the shuffle locations, and filled into the shuffle locations in the reverse order, that is, the second cartridge first and the first cartridge second. In this manner, the tier order of the first and second cartridges is preserved, that is, the tier order of the first and second cartridges is not changed relative to each other from the original tier order of the first and second cartridge in the source cell. It is appreciated that in other embodiments, the accessor may be configured to hold and transport a greater or fewer number of cartridges at a time.

If the cell is determined (block 1054) to not be empty, the front-most cartridge (which was originally the third cartridge scanned in block 1042) is removed or extracted (block 1026) from the cell. If the cell is again determined (block 1030) to not be empty, the front-most cartridge which has moved up to tier 1 (the original fourth cartridge in this example) is scanned and is removed or extracted (block 1034) from the cell. In this example, the third and fourth cartridges of the five cartridges originally located in the cell have been removed at this point.

If the cell is again determined (block 1038) to not be empty, the front-most cartridge which is the fifth cartridge in this example, has moved up to the tier 1 position and is scanned (block 1042). The removed cartridges (the original third and fourth cartridges in this example) are transported (block 1046) to an available shuffle slot or slots, depending upon how many cartridges were removed. The cartridge audit is updated (block 1050) to indicate the new locations of the removed third and fourth cartridges.

If the cell is determined (block 1054) to not be empty, the front-most cartridge (which was originally the fifth cartridge scanned in block 1042) is removed or extracted (block 1026) from the cell. In this example, the fifth cartridge of the five cartridges originally located in the cell has been removed at this point.

In this example, the cell is determined (block 1038) to be empty, and the removed cartridge (the original fifth cartridge in this example) is transported (block 1046) to an available shuffle slot. The cartridge audit is updated (block 1050) to indicate the new location of the removed fifth cartridge.

At this point, the cell is empty and the empty cell is designated the initially empty transport destination cell in the column, and a tier order preserving column audit (block 1018) is initiated. If the designated destination cell is the top cell of the column, a tier order preserving column audit is initiated in which cartridges are moved up the column in a manner similar to the column audit 914 of FIG. 9. Conversely, if the designated destination cell is the bottom cell of the column, a tier order preserving column audit is initiated in which cartridges are moved down the column in a manner similar to the column audit 922 of FIG. 9.

Although the embodiment of FIG. 10 is described as emptying a single cell which is to be designated the initial destination cell of a column to be audited, it is appreciated that a similar procedure may be used for two or more cells which are each to be designated as a destination cell of a column to be audited. The cells to be emptied and designated destination cells may be located at the top of the column or may be located at the bottom of the column or at one or more intermediate locations as previously described.

Figure 11:
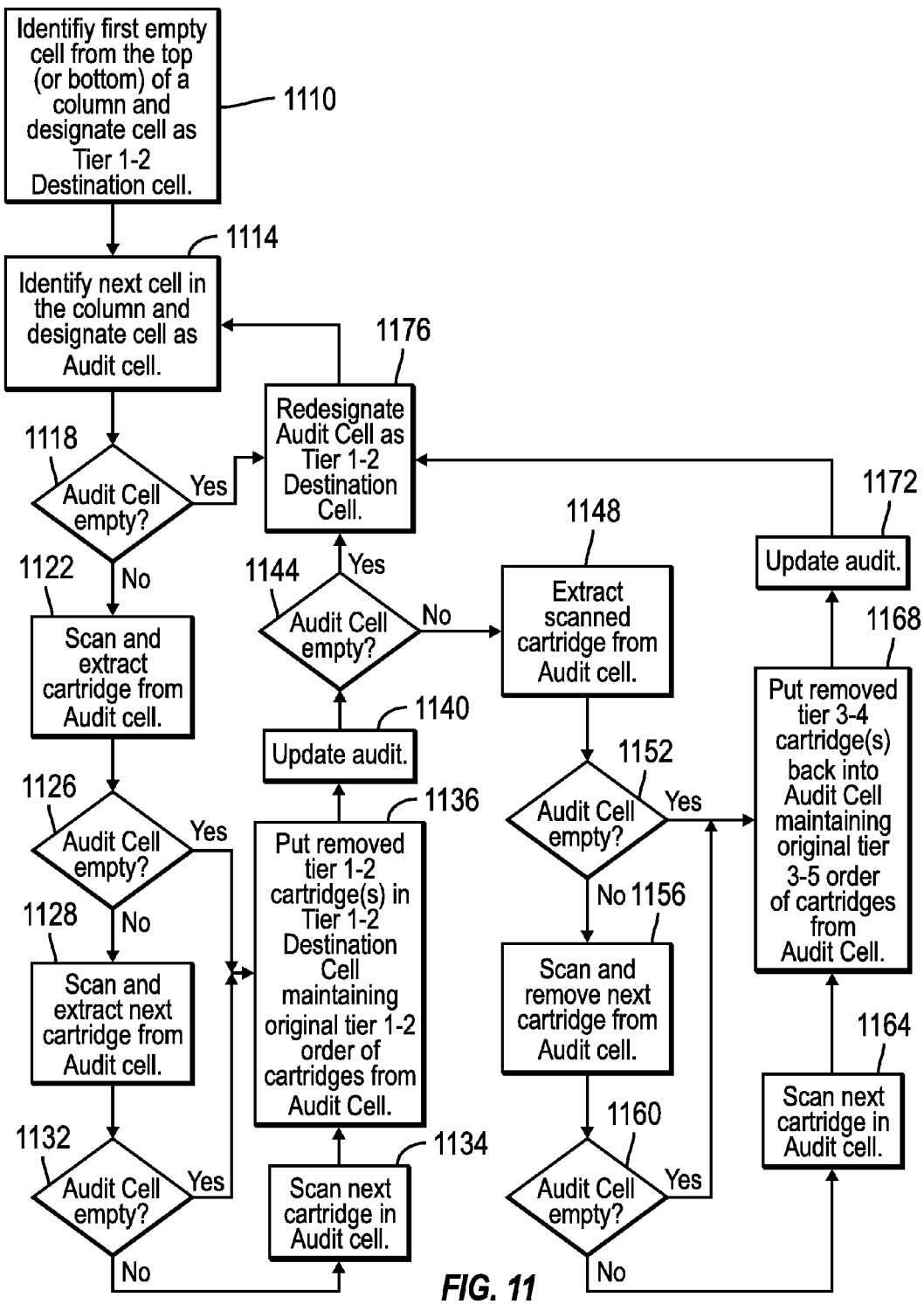
FIG. 11 illustrates another embodiment of operations for inventory management of data storage media in accordance with one aspect of the present description.

FIG. 11 depicts an embodiment of operations inventorying data storage cartridges stored in an automated data storage library having a plurality of multi-cartridge deep slot cells, each configured to store up to a plurality of data storage cartridges arranged in sequential order of tiers from front to rear. In this example, the inventory process depicted is a tier order preserving column audit for a column of multi-cartridge deep slot cells designated cell_0, cell_1 . . . cell_n as depicted schematically in FIGS. 12A-12D. Each multi-cartridge deep slot cell, cell_0, cell_1 . . . cell_n, is configured to store a plurality of data storage cartridges arranged in sequential order of tiers, tier1, tier2 . . . tier5, from front to rear, respectively. Thus, cell cell_a has in this example, five cartridges, cartridge_a1, cartridge_a2, . . . cartridge_a5, arranged in sequential order of tiers, tier1, tier2 . . . tier5 of cell cell_a. Similarly, cell cell_b has in this example, five cartridges, cartridge_b1, cartridge_b2, . . . cartridge_b5, arranged in sequential order of tiers, tier1, tier2 . . . tier5 of cell cell_b. The bottom most cell cell_n of the column has in this example, five cartridges, cartridge_n1, cartridge_n2, . . . cartridge_n5, arranged in sequential order of tiers, tier1, tier2 . . . tier5 of cell cell_n. It is appreciated that the number of slots, tiers and cartridges in each cell may vary, depending upon the particular application.

In a first operation, the library controller finds or otherwise identifies (block 1110) the first empty cell from the top (or bottom) of the column being audited and designates that cell as the "Tier 1-2 destination cell". As previously mentioned, such a determination may be made by positioning an accessor such as the accessor 18 in front of a cell and scanning the cell to see if a cartridge is in the cell. Other techniques may be utilized as well, depending upon the particular application.

Figure 12A:
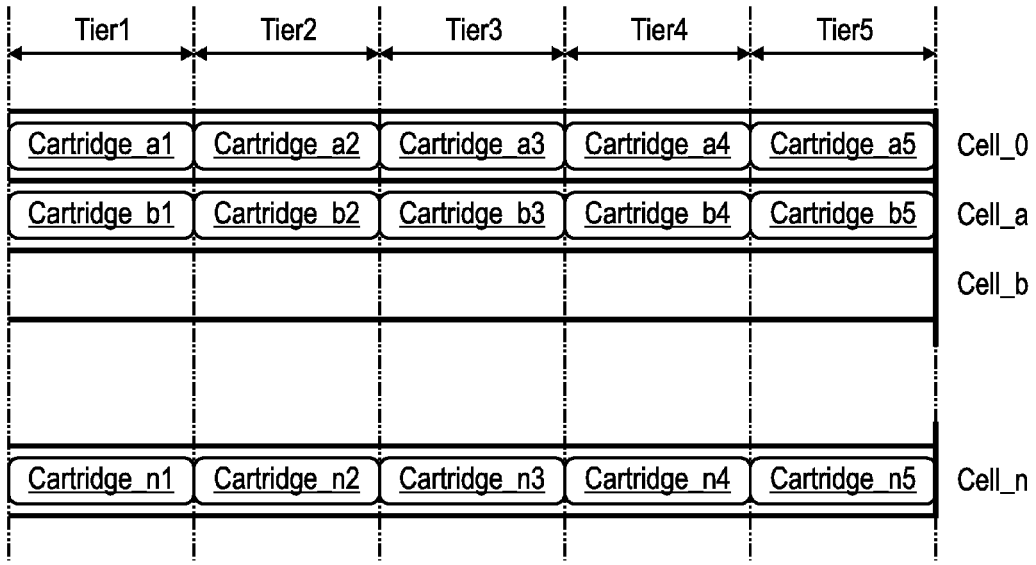
FIG. 12A-12D are schematic diagrams of a column of cells illustrating movement of data storage media in one embodiment of operations for inventory management in accordance with one aspect of the present description.

In the example of FIG. 12A, the first empty cell from the top of the column being audited is the cell cell_0 and as such is designated by the library controller as the Tier 1-2 destination cell. The empty cell cell_0 is designated the Tier 1-2 destination cell because, as explained in greater detail below, the tier1 and tier2 cartridges of the source cell being audited will be transported to the cell cell_0 and filled into the cell cell_0. If the top cell, cell_0, was not initially empty, the cell may be emptied using a cell emptying process such as that described in connection with FIG. 10, for example.

In another operation, the library controller identifies (block 1114) the next cell in the column being audited and designates that cell as the "Audit cell." In the example of FIG. 12A, the next cell in the column being audited is the cell cell_a and as such is designated as the "Audit cell." The cell cell_a is designated as the Audit cell" because the cartridges in that cell will be identified and their locations reported and stored in the cartridge audit data structure as a part of the audit process. Thus, in one embodiment, the library controller identifies (block 1114) the next cell which is cell_a as the cell in the column by repositioning the accessor 18 (FIGS. 2, 3) from the Tier 1-2 destination cell, cell_0, to the next adjacent cell of the column, cell_a in this example, and designates that cell as the "Audit cell."

A determination (block 1118) is made as to whether the Audit cell cell_a is empty as described above. Again, such a determination may be made by scanning the cell using the accessor 18 to determine if a cartridge is in the Audit cell which is cell_a in this example. Other techniques may be utilized as well, depending upon the particular application.

As shown in FIG. 12A, in this example, the Audit cell cell_a is not empty but instead contains five cartridges, cartridge_a1, cartridge_a2, . . . cartridge_a5, arranged in an original sequential order of tiers, tier1, tier2 . . . tier5, respectively of cell cell_a. Accordingly, the Audit cell cell_a is determined (block 1118) to not be empty, and the front-most cartridge, cartridge_a1, in tier1 is scanned and extracted (block 1122) by the accessor 18 from the cell cell_a by the accessor 18 using its gripper assembly 20. If the cell cell_a is again determined (block 1126) to not be empty, the front-most cartridge which has been moved up (promoted) to the tier1 position by the biasing springs 152 (FIG. 7A), is scanned and is extracted or otherwise removed (block 1128) from the cell_a Accordingly, the next-in-line cartridge cartridge_a2 which was originally in the tier2 position, has moved up to the tier1 position of cell_a, is scanned and removed (block 1128). As a result, in this example, the first and second cartridges, cartridge_a1 and cartridge_a2, a first subset of the five cartridges originally located in the cell cell_a, have been scanned and extracted at this point.

Figure 12B:
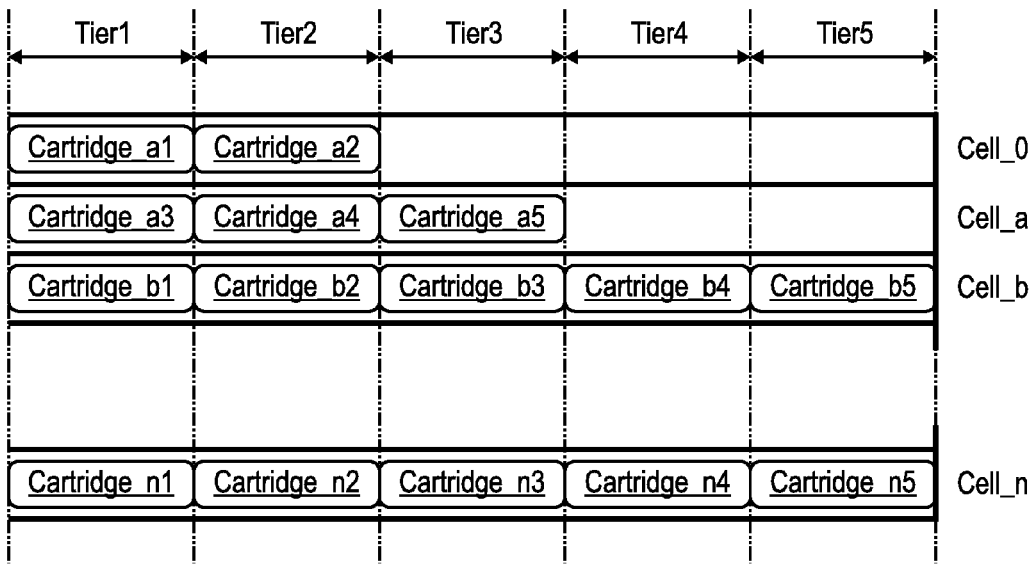

If the cell is again determined (block 1132) to not be empty, the front-most cartridge which is the third cartridge, cartridge_a3 in this example, has moved up to the tier1 position and is scanned (block 1134). The removed cartridges (the original first cartridge, cartridge_a1 originally in the tier1 position, and the second cartridge, cartridge_a2 originally in the tier2 position in this example) are transported (block 1136) to the Tier 1-2 destination cell, which is cell cell__0 in this example, and filled into Tier 1-2 destination cell as shown in FIG. 12B. In this manner, the scanned and extracted first subset of data storage cartridges is transported to a destination multi-cartridge deep slot cell of the column of cells being audited and filled into the destination cell so that each data storage cartridge of the transported first subset of data storage cartridges is filled into an empty tier of the destination multi-cartridge deep slot cell. Moreover, the first subset of data storage cartridges is stored in the destination multi-cartridge deep slot cell while maintaining the original tier order of the first subset of data storage cartridges.

In this example, the first subset of data storage cartridges of cell_a transported to a destination multi-cartridge deep slot cell of the column of cells being audited, are the front and minimum depth cartridges of the Audit cell and are two cartridges in number. It is appreciated that the first subset of data storage cartridges of the cell being audited and transported to a destination multi-cartridge deep slot cell of the column of cells being audited, may have fewer or a greater number of data storage cartridges, depending upon the particular application.

As set forth above, in the illustrated embodiment, the accessor 18 is capable of holding two cartridges at a time and transporting them at the same time to the destination cell. It is appreciated that in other embodiments, the accessor may be configured to hold and transport a greater or fewer number of cartridges at a time.

In addition, the accessor 18 is configured so that the cartridges may be extracted from a source cell (here the Audit cell, cell_a) in a particular order, such as the first cartridge first and the second cartridge second, transported to the destination cell, and filled into the destination cell in the reverse order, that is, the second cartridge first and the first cartridge second. In this manner, the tier order of the first and second cartridges is preserved, that is, the tier order of the first and second cartridges is not changed relative to each other in the destination cell from the original tier order of the first and second cartridge in the source cell.

In this example, the removed cartridges (the original first cartridge, cartridge_a1 originally in the tier1 position, and the second cartridge, cartridge_a2 originally in the tier2 position in the Audit cell cell_a in this example) are transported (block 1136) to the Tier 1-2 destination cell, which is cell cell__0 in this example, and filled into Tier 1-2 destination cell preserving the original tier order, that is, cartridge_a1 is in the tier1 position of the destination cell cell__0, and cartridge_a2 is in the tier2 position of the destination cell cell__0 as shown in FIG. 12B. The accessor 18 fills the second cartridge, cartridge_a2 into the Tier 1-2 destination cell (cell__0) first and fills the first cartridge, cartridge_a1 into the Tier 1-2 destination cell (cell__0) second such that the original tier order of the first subset of cartridges is maintained.

The cartridge audit is updated (block 1040) to indicate the new locations of the removed first and second cartridges. A determination (block 1144) is made as to whether the Audit cell cell_a is empty as described above. In this example, as shown in FIG. 12B, the Audit cell being audited, that is, cell_a, is not empty but instead, three cartridges remain, cartridge_a3, cartridge_a4 and cartridge_a5, which have been promoted by the biasing springs 152 to the tier1, tier2 and tier3 positions, respectively, of cell_a, the cell being audited.

Accordingly, the Audit cell cell_a is determined (block 1144) to not be empty, and the front-most cartridge, cartridge_a3, in tier1 is extracted (block 1148) by the accessor 18 from the cell cell_a by the accessor 18 using its gripper assembly 20. If the cell cell_a is again determined (block 1152) to not be empty, the front-most cartridge which has been moved up (promoted) to the tier1 position by the biasing springs 152 (FIG. 7A), is scanned and is extracted or otherwise removed (block 1128) from the cell_a. Accordingly, the next-in-line cartridge cartridge_a4 which was previously in the tier2 position, has moved up to the tier1 position of cell_a, is scanned and removed (block 1156). As a result, in this example, the third and fourth cartridges, cartridge_a3 and cartridge_a4, a second subset of the five cartridges originally located in the cell cell_a, have been scanned and extracted at this point. In this example, the second subset of data storage cartridges of cell_a, are the intermediate depth cartridges of the Audit cell (originally positioned after the first subset of cartridges of the cell being audited as shown in FIG. 12A), and are two cartridges in number. It is appreciated that the second subset of data storage cartridges of the cell being audited, may have fewer or a greater number of data storage cartridges, depending upon the particular application.

If the cell is again determined (block 1160) to not be empty, the front-most cartridge which is the fifth cartridge, cartridge_a5, in this example, is a third subset of data storage cartridges, has moved up to the tier1 position and is scanned (block 1164). In accordance with another aspect of the present description, the scanned and removed second subset of cartridges (that is, the original third cartridge, cartridge_a3 originally in the tier3 position, and the fourth cartridge, cartridge_a4 originally in the tier4 position as shown in FIG. 12A, in this example) are not transported to the Tier 1-2 destination cell (cell__0) as was done for the scanned and removed first subset of data storage cartridges, Instead, the scanned and removed second subset of cartridges (that is, the original third cartridge, cartridge_a3 originally in the tier3 position, and the fourth cartridge, cartridge_a4 originally in the tier4 position as shown in FIG. 12A, in this example), are filled (block 1168) back into their original cell which is the Audit cell (cell_a) in this example, as shown in FIG. 12B. In this manner, each data storage cartridge of the scanned and extracted second subset of data storage cartridges, is filled into a tier of the cell being audited, that is, the Audit cell cell_a while maintaining the original tier order of the second subset of data storage cartridges. It is believed that filling the second subset of cartridges back into the original audit cell instead of transporting the second subset of cartridges to a different destination cell may, in some embodiments, facilitate reducing the amount of time expended in the inventory process. It is further believed that by leaving a third subset of cartridges, the fifth cartridge cartridge_a5 in this example, in the original cell rather than extracting the third subset from the audit cell, the fifth cartridge cartridge_a5 of the third subset need not be moved by the accessor and thus may also facilitate reducing the amount of time expended in the inventory process. In this example, the third subset of data storage cartridges of cell_a, is the last or maximum depth cartridge of the Audit cell (originally positioned after the second subset of cartridges of the cell being audited as shown in FIG. 12A), and is one cartridge in number. It is appreciated that the third subset of data storage cartridges of the cell being audited, may have fewer or a greater number of data storage cartridges, depending upon the particular application.

In this example, the scanned and removed cartridges (the original third cartridge, cartridge_a3 originally in the tier3 position, and the fourth cartridge, cartridge_a4 originally in the tier4 position in the Audit cell cell_a as shown in FIG. 12A in this example) are filled back into the Audit cell cell_a preserving the original tier order as shown in FIG. 12B. More specifically, in this example, the original third cartridge_a3 is now in the tier1 position of the Audit cell cell_a, and fourth cartridge_a4 is now in the tier2 position of the Audit cell, cell_a. Since the tier positions of the cartridges cartridge_a3 and cartridge_a4, are of the same or higher order than their respective original tier positions depicted in FIG. 12A, the tier order of the third and fourth cartridges cartridge_a3 and cartridge_a4, have been preserved. Similarly, the original fifth cartridge_a5 is now in the tier3 position of the Audit cell cell_a as shown in FIG. 12B. Since the tier position of the cartridge cartridge_a5 is of the same or higher order than its original tier position (tier5) depicted in FIG. 12A, the tier order of the fifth cartridge cartridge_a5, has also been preserved.

The cartridge audit is updated (block 1172) to indicate the new locations of the relocated third and fourth cartridges of the second subset and the fifth cartridge. Having scanned and identified all data storage cartridges of the Audit cell, cell_a, the Audit cell, cell_a, may be redesignated (block 1176) as the Tier 1-2 Destination cell instead of cell_0, and the process may be repeated for the next adjacent cell of the column being audited.

Thus, in another operation, the library controller identifies (block 1114) the next cell in the column being audited and designates that cell as the "Audit cell." In the example of FIG. 12B, the next cell in the column being audited is the cell cell_b and as such is designated as the new "Audit cell." The cell cell_b is designated as the Audit cell" because the cartridges in that cell will be scanned and identified and their locations reported and recorded in the cartridge audit as a part of the audit process. Thus, in one embodiment, the library controller identifies (block 1114) the next cell which is cell_b as the cell in the column by repositioning the accessor 18 (FIGS. 2, 3) from the Tier 1-2 destination cell, cell_a, to the next adjacent cell of the column, cell_b in this example, and designates that cell as the "Audit cell."

A determination (block 1118) is made as to whether the Audit cell cell_b is empty as described above. Again, such a determination may be made by scanning the cell using the accessor 18 to determine if a cartridge is in the Audit cell which is cell_b in this example. Other techniques may be utilized as well, depending upon the particular application.

As shown in FIG. 12B, in this example, the Audit cell cell_b is not empty but instead contains five cartridges, cartridge_b1, cartridge_b2, . . . cartridge_b5, arranged in an original sequential order of tiers, tier1, tier2 . . . tier5, respectively of cell cell_b. Accordingly, the Audit cell cell_b is determined (block 1118) to not be empty, and the front-most cartridge, cartridge_b1, in tier1 is scanned and extracted (block 1122) by the accessor 18 from the cell cell_b by the accessor 18 using its gripper assembly 20. If the cell cell_b is again determined (block 1126) to not be empty, the front-most cartridge which has been moved up (promoted) to the tier1 position by the biasing springs 152 (FIG. 7A), is scanned and is extracted or otherwise removed (block 1128) from the cell_b. Accordingly, the next-in-line cartridge cartridge_b2 which was originally in the tier2 position, has moved up to the tier1 position of cell_b, is scanned and removed (block 1128). As a result, in this example, the first and second cartridges, cartridge_b1 and cartridge_b2, a first subset of the five cartridges originally located in the cell cell_b), has been scanned and extracted at this point.

Figure 12C:
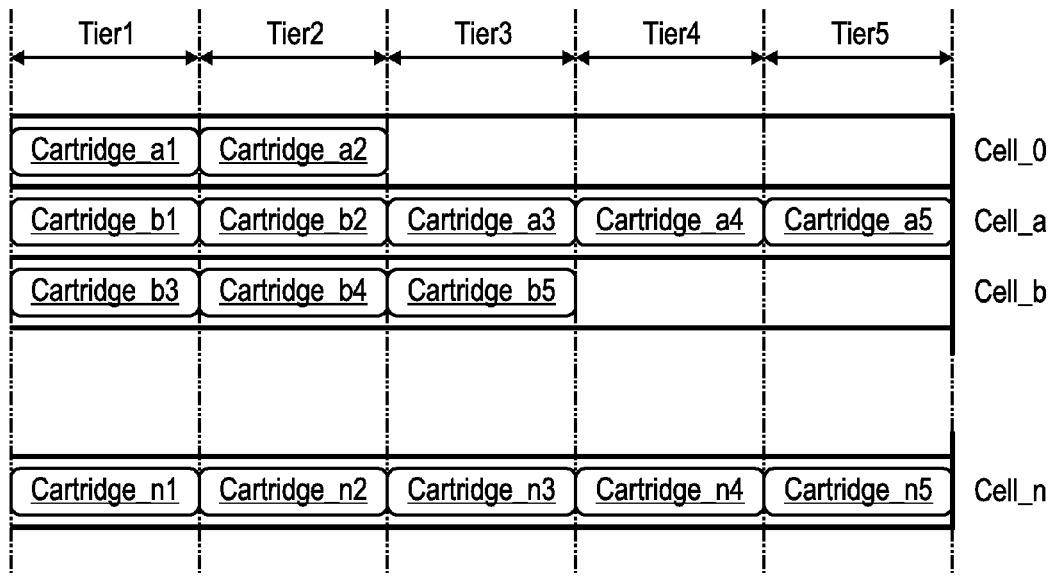

If the cell is again determined (block 1132) to not be empty, the front-most cartridge which is the third cartridge, cartridge_b3 in this example, has moved up to the tier1 position and is scanned (block 1134). The scanned and removed cartridges (the original first cartridge, cartridge_b1 originally in the tier1 position, and the second cartridge, cartridge_b2 originally in the tier2 position in this example) are transported (block 1136) to the Tier 1-2 destination cell, which is cell cell_a in this example, and filled into Tier 1-2 destination cell as shown in FIG. 12C. In this manner, the scanned and extracted first subset of data storage cartridges of the Audit cell cell_b is transported to a destination multi-cartridge deep slot cell of the column of cells being audited and filled into the destination cell so that each data storage cartridge of the transported first subset of data storage cartridges is filled into a tier of the destination multi-cartridge deep slot cell. Moreover, the first subset of data storage cartridges is stored in the destination multi-cartridge deep slot cell while maintaining the original tier order of the first subset of data storage cartridges.

In this example, the first subset of data storage cartridges of cell_b transported to a destination multi-cartridge deep slot cell of the column of cells being audited, is two cartridges in number. It is appreciated that the first subset of data storage cartridges of the cell being audited and transported to a destination multi-cartridge deep slot cell of the column of cells being audited, may have fewer or a greater number of data storage cartridges, depending upon the particular application.

As set forth above, in the illustrated embodiment, the accessor 18 is capable of holding two cartridges at a time and transporting them at the same time to the destination cell. It is appreciated that in other embodiments, the accessor may be configured to hold and transport a greater or fewer number of cartridges at a time.

In addition, the accessor 18 is configured so that the cartridges may be extracted from a source cell (here the Audit cell, cell_b) in a particular order, such as the first cartridge first and the second cartridge second, transported to the destination cell, and filled into the destination cell in the reverse order, that is, the second cartridge first and the first cartridge second. In this manner, the tier order of the first and second cartridges is preserved, that is, the tier order of the first and second cartridges is not changed relative to each other in the destination cell from the original tier order of the first and second cartridge in the source cell.

In this example, the removed cartridges (the original first cartridge, cartridge_b1 originally in the tier1 position, and the second cartridge, cartridge_b2 originally in the tier2 position in the Audit cell cell_b in this example) are transported (block 1136) to the Tier 1-2 destination cell, which is cell cell_a in this example, and filled into Tier 1-2 destination cell preserving the original tier order, that is, cartridge_b1 is in the tier1 position of the destination cell cell_a, and cartridge_b2 is in the tier2 position of the destination cell cell_a. The accessor 18 fills the second cartridge, cartridge_b2 into the Tier 1-2 destination cell (cell_a) first and fills the first cartridge, cartridge_b1 into the Tier 1-2 destination cell (cell_a) second such that the original tier order of the first subset of cartridges is maintained.

As the accessor 18 fills the cartridges, cartridge_b2 and cartridge_b1 into the Tier 1-2 destination cell (cell_a), the cartridges, cartridge_a3, cartridge_a4, cartridge_a5, in the Tier 1-2 destination cell (cell_a), are demoted to the tier3, tier4, tier5, positions respectively, of the Tier 1-2 destination cell (cell_a), as shown in FIG. 12C. However, because the original tier positions of the cartridge_a3, cartridge_a4, and cartridge_a5 were originally the tier3, tier4, and tier5, positions respectively, of the cell_a, as shown in FIG. 12A, the tier positions of the cartridge_a3, cartridge_a4, and cartridge_a5 are also preserved.

The cartridge audit is updated (block 1040) to indicate the new locations in cell_a of the first and second cartridges removed from cell_b and the new demoted locations of the third, fourth and fifth cartridges of cell_a which remain in cell_a. A determination (block 1140) is made as to whether the Audit cell cell_b is empty as described above. In this example, as shown in FIG. 12C, the Audit cell being audited, that is, cell_b, is not empty but instead, three cartridges remain, cartridge_b3, cartridge_b4 and cartridge_b5, which have been promoted by the biasing springs 152 to the tier1, tier2 and tier3 positions, respectively, of cell_b, the cell being audited.

Accordingly, the Audit cell cell_b is determined (block 1140) to not be empty, and the front-most cartridge, cartridge_b3, in tier1 is extracted (block 1148) by the accessor 18 from the cell cell_b by the accessor 18 using its gripper assembly 20. If the cell cell_b is again determined (block 1152) to not be empty, the front-most cartridge which has been moved up (promoted) to the tier1 position by the biasing springs 152 (FIG. 7A), is scanned and is extracted or otherwise removed (block 1128) from the cell_b. Accordingly, the next-in-line cartridge cartridge_b4 which was originally in the tier2 position, has moved up to the tier1 position of cell_b, is scanned and removed (block 1156). As a result, in this example, the third and fourth cartridges, cartridge_b3 and cartridge_b4, a second subset of the five cartridges originally located in the cell cell_b, have been scanned and extracted at this point.

If the cell is again determined (block 1160) to not be empty, the front-most cartridge which is the fifth cartridge, cartridge_b5, in this example, has moved up to the tier1 position and is scanned (block 1164). In accordance with another aspect of the present description, the scanned and removed second subset of cartridges (that is, the original third cartridge, cartridge_b3 originally in the tier3 position, and the fourth cartridge, cartridge_b4 originally in the tier4 position as shown in FIG. 12B, in this example) are not transported to the Tier 1-2 destination cell (cell_a) as was done for the scanned and removed first subset of data storage cartridges. Instead, the scanned and removed second subset of cartridges (that is, the original third cartridge, cartridge_b3 originally in the tier3 position, and the fourth cartridge, cartridge_b4 originally in the tier4 position as shown in FIG. 12B, in this example), are filled (block 1168) back into their original cell which is the Audit cell (cell_b) in this example, as shown in FIG. 12C. In this manner, each data storage cartridge of the scanned and extracted second subset of data storage cartridges, is filled into a tier of the cell being audited, that is, the Audit cell cell_b while maintaining the original tier order of the second subset of data storage cartridges.

In this example, the scanned and removed cartridges (the original third cartridge, cartridge_b3 originally in the tier3 position, and the fourth cartridge, cartridge_b4 originally in the tier4 position in the Audit cell cell_b as shown in FIG. 12B in this example) are filled back into the Audit cell cell_b preserving the original tier order as shown in FIG. 12C. More specifically, in this example, the original third cartridge_b3 is now in the tier1 position of the Audit cell cell_b, and fourth cartridge_b4 is now in the tier2 position of the Audit cell, cell_b. Since the tier positions of the cartridges cartridge_b3 and cartridge_b4, is of the same or higher order than their respective original tier positions depicted in FIG. 12B, the tier order of the third and fourth cartridges cartridge_b3 and cartridge_b4, have been preserved. Similarly, the original fifth cartridge_b5 is now in the tier3 position of the Audit cell cell_b as shown in FIG. 12C. Since the tier position of the cartridge cartridge_b5 is of the same or higher order than its original tier position (tier5) depicted in FIG. 12B, the tier order of the fifth cartridge cartridge_b5, has also been preserved.

The cartridge audit is updated (block 1172) to indicate the new locations of the relocated third and fourth cartridges of the second subset and the fifth cartridge. Having scanned and identified all data storage cartridges of the Audit cell, cell_b, the Audit cell, cell_b, may be redesignated (block 1176) as the Tier 1-2 Destination cell instead of cell_a, and the process may be repeated for the next adjacent cell of the column being audited, which is cell_c (not shown) in the example of FIG. 12C.

Thus, in another operation, the library controller identifies (block 1114) the next cell in the column being audited and designates that cell as the "Audit cell." In the example of FIG. 12C, the next cell in the column being audited is the cell cell_c (not shown) and as such is designated as the "Audit cell." The cell cell_c is designated as the Audit cell" because the cartridges in that cell will be scanned and identified and their locations reported as a part of the audit process.

Figure 12D:
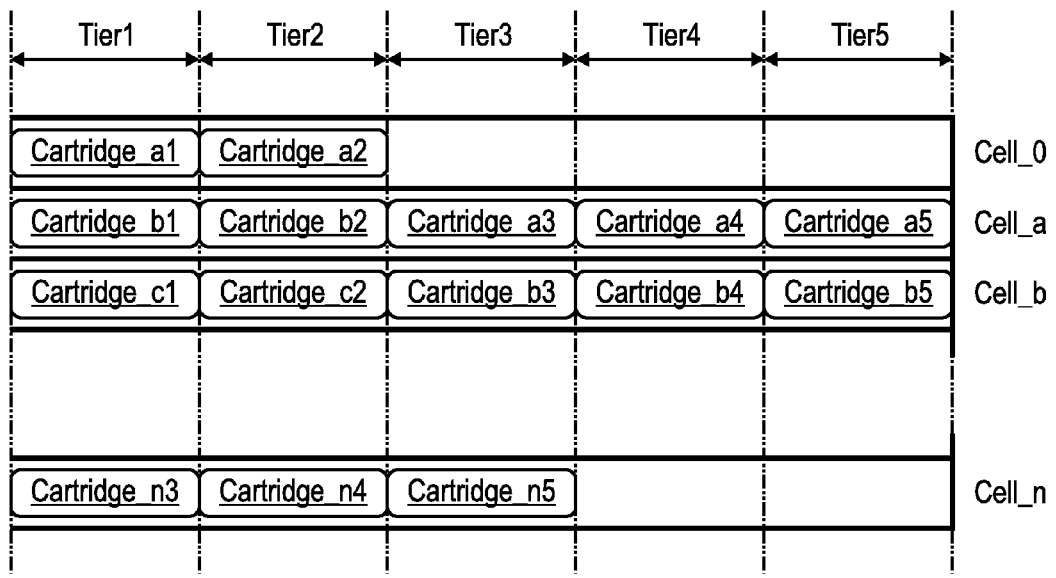

In this manner, the first subset of data storage cartridges, cartridge_c1 and cartridge_c2) of the Audit cell, cell_c, are scanned and extracted (blocks 1122, 1126) and transported and filled (block 1136) into the destination multi-cartridge deep slot cell (cell_b) as shown in FIG. 12D so that the first subset of data storage cartridges of cell_c is stored in the destination multi-cartridge deep slot cell while maintaining the original tier order of the first subset of data storage cartridges.

As the accessor 18 fills the cartridges, cartridge_c2 and cartridge_c1 into the Tier 1-2 destination cell (cell_b), the cartridges, cartridge_b3, cartridge_b4, cartridge_b5, in the Tier 1-2 destination cell (cell_b), are demoted to the tier3, tier4, tier5, positions respectively, of the Tier 1-2 destination cell (cell_b), as shown in FIG. 12D. However, because the original tier positions of the cartridge_b3, cartridge_b4, and cartridge_b5 were originally the tier3, tier4, and tier5, positions respectively, of the cell_b, as shown in FIG. 12B, the tier positions of the cartridge_b3, cartridge_b4, and cartridge_b5 are also preserved.

Similarly, the scanned and removed cartridges of the second subset (not shown) originally in the tier3 position, and the tier4 position in the Audit cell cell_c (not shown) are filled back into the Audit cell cell_c preserving the original tier order. The process of blocks 1114-1176 of FIG. 11 is repeated until all cells of the column have been identified (block 1114) and audited. Once the audit of a column has been repeated, the column audit of FIG. 11 may be repeated for the next column of cells to be audited. Once all cells of all columns have been audited, the inventory is complete. It is appreciated however, that an inventory may be selected for a subset of cells of the library rather than all cells, in some applications.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing description of various embodiments has been presented for the purposes of illustration and description. It is not intended to be exhaustive or to limit to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A method for inventorying data storage cartridges stored in an automated data storage library having a plurality of multi-cartridge deep slot cells, each configured to store up to a plurality of data storage cartridges arranged in sequential order of tiers from front to rear, comprising:
   identifying a first multi-cartridge deep slot cell;
   scanning and extracting a first subset of data storage cartridges from a second multi-cartridge deep slot cell having a first plurality of data storage cartridges in a first tier order;
   transporting the extracted first subset of data storage cartridges to the first multi-cartridge deep slot cell;
   filling each data storage cartridge of the transported first subset of data storage cartridges in an empty tier of the first multi-cartridge deep slot cell so that the first subset of data storage cartridges is stored in the first multi-cartridge deep slot cell while maintaining the first tier order of the first subset of data storage cartridges;
   scanning and extracting a second subset of the first plurality of data storage cartridges from the second multi-cartridge deep slot cell; and
   filling each data storage cartridge of the second subset of data storage cartridges in an empty tier of the second multi-cartridge deep slot cell so that the second subset of data storage cartridges is stored in the second multi-cartridge deep slot cell while maintaining the first tier order of the second subset of data storage cartridges.

2. The method of claim 1, further comprising:
   scanning a third subset of the first plurality of data storage cartridges of the second multi-cartridge deep slot cell before filling each data storage cartridge of the second subset of data storage cartridges in an empty tier of the second multi-cartridge deep slot cell.

3. The method of claim 1, wherein the scanning and extracting a first subset of data storage cartridges from the second multi-cartridge deep slot cell includes scanning a first data storage cartridge stored in the second multi-cartridge deep slot cell, extracting the first data storage cartridge from the second multi-cartridge deep slot cell, scanning a second data storage cartridge in the second multi-cartridge deep slot cell, and extracting the second data storage cartridge from the second multi-cartridge deep slot cell.

4. The method of claim 3, wherein the scanning and extracting the second subset of data storage cartridges from the second multi-cartridge deep slot cell includes scanning a third data storage cartridge stored in the second multi-cartridge deep slot cell, extracting the third data storage cartridge from the second multi-cartridge deep slot cell, scanning a fourth data storage cartridge in the second multi-cartridge deep slot cell, and extracting the fourth data storage cartridge from the second multi-cartridge deep slot cell.

5. The method of claim 4, wherein the filling each data storage cartridge of the second subset of data storage cartridges in an empty tier of the second multi-cartridge deep slot cell includes filling the fourth data storage cartridge into the second multi-cartridge deep slot cell, filling the third data storage cartridge into the second multi-cartridge deep slot cell, so that the third and fourth data storage cartridges of the second subset of data storage cartridges occupy the first and second tier positions of the second multi-cartridge deep slot cell.

6. The method of claim 5, wherein the filling each data storage cartridge of the first subset of data storage cartridges in an empty tier of the first multi-cartridge deep slot cell includes filling the second data storage cartridge into the first multi-cartridge deep slot cell, filling the first data storage cartridge into the first multi-cartridge deep slot cell, so that the first and second data storage cartridges of the first subset of data storage cartridges occupy the first and second tier positions of the first multi-cartridge deep slot cell.

7. The method of claim 6 further comprising:
   scanning and extracting a first subset of data storage cartridges from a third multi-cartridge deep slot cell having a second plurality of data storage cartridges in a second tier order;
   transporting the extracted first subset of data storage cartridges of the second plurality of data storage cartridges to the second multi-cartridge deep slot cell;
   filling each data storage cartridge of the transported first subset of the second plurality of data storage cartridges in a tier of the second multi-cartridge deep slot cell so that the first subset of the second plurality of data storage cartridges is stored in the second multi-cartridge deep slot cell while maintaining the second tier order of the first subset of the second plurality of data storage cartridges;
   scanning and extracting a second subset of the second plurality of data storage cartridges from the third multi-cartridge deep slot cell; and
   filling each data storage cartridge of the second subset of the second plurality of data storage cartridges in a tier of the third multi-cartridge deep slot cell so that the second subset of data storage cartridges of the second plurality of data storage cartridges is stored in the third multi-cartridge deep slot cell while maintaining the second tier order of the second subset of the second plurality of data storage cartridges.

8. The method of claim 7 wherein the first, second and third multi-cartridge deep slot cells are arranged in a column.

9. The method of claim 1 further comprising updating a cartridge audit data structure with the identify and location of each scanned data storage cartridge.

10. An automated data storage library for a plurality of data storage cartridges, comprising:
    at least a plurality of multi-cartridge deep slot cells, each configured to store up to a plurality of the data storage cartridges arranged in sequential order of tiers from front to rear;
    at least one accessor configured to selectively scan data storage cartridges and to extract, fill and transport data storage cartridges with respect to said multi-cartridge deep slot cells; and
    a library controller configured to inventory data storage cartridges with respect to said multi-cartridge deep slot cells, and to operate said accessor to selectively scan, extract, fill and transport data storage cartridges, said library controller having at least one computer readable storage medium having computer readable program code embodied therein that is enabled to cause inventory operations to be performed, the inventory operations comprising:
identifying a first multi-cartridge deep slot cell;
scanning and extracting a first subset of data storage cartridges from a second multi-cartridge deep slot cell having a first plurality of data storage cartridges in a first tier order;
transporting the extracted first subset of data storage cartridges to the first multi-cartridge deep slot cell;
filling each data storage cartridge of the transported first subset of data storage cartridges in an empty tier of the first multi-cartridge deep slot cell so that the first subset of data storage cartridges is stored in the first multi-cartridge deep slot cell while maintaining the first tier order of the first subset of data storage cartridges;
scanning and extracting a second subset of the first plurality of data storage cartridges from the second multi-cartridge deep slot cell; and
filling each data storage cartridge of the second subset of data storage cartridges in an empty tier of the second multi-cartridge deep slot cell so that the second subset of data storage cartridges is stored in the second multi-cartridge deep slot cell while maintaining the first tier order of the second subset of data storage cartridges.

11. The library of claim 10, wherein the inventory operations further comprise:
scanning a third subset of the first plurality of data storage cartridges of the second multi-cartridge deep slot cell before filling each data storage cartridge of the second subset of data storage cartridges in an empty tier of the second multi-cartridge deep slot cell.

12. The library of claim 10, wherein the scanning and extracting a first subset of data storage cartridges from the second multi-cartridge deep slot cell includes scanning a first data storage cartridge stored in the second multi-cartridge deep slot cell, extracting the first data storage cartridge from the second multi-cartridge deep slot cell, scanning a second data storage cartridge in the second multi-cartridge deep slot cell, and extracting the second data storage cartridge from the second multi-cartridge deep slot cell.

13. The library of claim 12, wherein the scanning and extracting the second subset of data storage cartridges from the second multi-cartridge deep slot cell includes scanning a third data storage cartridge stored in the second multi-cartridge deep slot cell, extracting the third data storage cartridge from the second multi-cartridge deep slot cell, scanning a fourth data storage cartridge in the second multi-cartridge deep slot cell, and extracting the fourth data storage cartridge from the second multi-cartridge deep slot cell.

14. The library of claim 13, wherein the filling each data storage cartridge of the second subset of data storage cartridges in an empty tier of the second multi-cartridge deep slot cell includes filling the fourth data storage cartridge into the second multi-cartridge deep slot cell, filling the third data storage cartridge into the second multi-cartridge deep slot cell, so that the third and fourth data storage cartridges of the second subset of data storage cartridges occupy the first and second tier positions of the second multi-cartridge deep slot cell.

15. The library of claim 14, wherein the filling each data storage cartridge of the first subset of data storage cartridges in an empty tier of the first multi-cartridge deep slot cell includes filling the second data storage cartridge into the first multi-cartridge deep slot cell, filling the first data storage cartridge into the first multi-cartridge deep slot cell, so that the first and second data storage cartridges of the first subset of data storage cartridges occupy the first and second tier positions of the first multi-cartridge deep slot cell.

16. The library of claim 15, wherein the inventory operations further comprise:
scanning and extracting a first subset of data storage cartridges from a third multi-cartridge deep slot cell having a second plurality of data storage cartridges in a second tier order;
transporting the extracted first subset of data storage cartridges of the second plurality of data storage cartridges to the second multi-cartridge deep slot cell;
filling each data storage cartridge of the transported first subset of the second plurality of data storage cartridges in a tier of the second multi-cartridge deep slot cell so that the first subset of the second plurality of data storage cartridges is stored in the second multi-cartridge deep slot cell while maintaining the second tier order of the first subset of the second plurality of data storage cartridges;
scanning and extracting a second subset of the second plurality of data storage cartridges from the third multi-cartridge deep slot cell; and
filling each data storage cartridge of the second subset of the second plurality of data storage cartridges in a tier of the third multi-cartridge deep slot cell so that the second subset of data storage cartridges of the second plurality of data storage cartridges is stored in the third multi-cartridge deep slot cell while maintaining the second tier order of the second subset of the second plurality of data storage cartridges.

17. The library of claim 16 wherein the first, second and third multi-cartridge deep slot cells are arranged in a column and wherein the inventory operations further comprise updating a cartridge audit data structure with the identify and location of each scanned data storage cartridge.

18. A computer program product for inventorying data storage cartridges stored in an automated data storage library having a plurality of multi-cartridge deep slot cells, each configured to store up to a plurality of data storage cartridges arranged in sequential order of tiers from front to rear, at least one accessor configured to selectively scan data storage cartridges and to extract, fill and transport data storage cartridges with respect to said multi-cartridge deep slot cells; and a library controller configured to inventory data storage cartridges with respect to said multi-cartridge deep slot cells, and to operate said accessor to selectively scan, extract, fill and transport data storage cartridges, the computer program product comprising at least one computer readable storage medium having computer readable program code embodied therein that is enabled to cause inventory operations to be performed, the inventory operations comprising:
identifying a first multi-cartridge deep slot cell;
scanning and extracting a first subset of data storage cartridges from a second multi-cartridge deep slot cell having a first plurality of data storage cartridges in a first tier order;
transporting the extracted first subset of data storage cartridges to the first multi-cartridge deep slot cell;
filling each data storage cartridge of the transported first subset of data storage cartridges in an empty tier of the first multi-cartridge deep slot cell so that the first subset of data storage cartridges is stored in the first multi-cartridge deep slot cell while maintaining the first tier order of the first subset of data storage cartridges;

scanning and extracting a second subset of the first plurality of data storage cartridges from the second multi-cartridge deep slot cell; and filling each data storage cartridge of the second subset of data storage cartridges in an empty tier of the second multi-cartridge deep slot cell so that the second subset of data storage cartridges is stored in the second multi-cartridge deep slot cell while maintaining the first tier order of the second subset of data storage cartridges.

19. The product of claim 18, wherein the inventory operations further comprise:
scanning a third subset of the first plurality of data storage cartridges of the second multi-cartridge deep slot cell before filling each data storage cartridge of the second subset of data storage cartridges in an empty tier of the second multi-cartridge deep slot cell.

20. The product of claim 18, wherein the scanning and extracting a first subset of data storage cartridges from the second multi-cartridge deep slot cell includes scanning a first data storage cartridge stored in the second multi-cartridge deep slot cell, extracting the first data storage cartridge from the second multi-cartridge deep slot cell, scanning a second data storage cartridge in the second multi-cartridge deep slot cell, and extracting the second data storage cartridge from the second multi-cartridge deep slot cell.

21. The product of claim 20, wherein the scanning and extracting the second subset of data storage cartridges from the second multi-cartridge deep slot cell includes scanning a third data storage cartridge stored in the second multi-cartridge deep slot cell, extracting the third data storage cartridge from the second multi-cartridge deep slot cell, scanning a fourth data storage cartridge in the second multi-cartridge deep slot cell, and extracting the fourth data storage cartridge from the second multi-cartridge deep slot cell.

22. The product of claim 21, wherein the filling each data storage cartridge of the second subset of data storage cartridges in an empty tier of the second multi-cartridge deep slot cell includes filling the fourth data storage cartridge into the second multi-cartridge deep slot cell, filling the third data storage cartridge into the second multi-cartridge deep slot cell, so that the third and fourth data storage cartridges of the second subset of data storage cartridges occupy the first and second tier positions of the second multi-cartridge deep slot cell.

23. The product of claim 22, wherein the filling each data storage cartridge of the first subset of data storage cartridges in an empty tier of the first multi-cartridge deep slot cell includes filling the second data storage cartridge into the first multi-cartridge deep slot cell, filling the first data storage cartridge into the first multi-cartridge deep slot cell, so that the first and second data storage cartridges of the first subset of data storage cartridges occupy the first and second tier positions of the first multi-cartridge deep slot cell.

24. The product of claim 23, wherein the inventory operations further comprise:
scanning and extracting a first subset of data storage cartridges from a third multi-cartridge deep slot cell having a second plurality of data storage cartridges in a second tier order;

transporting the extracted first subset of data storage cartridges of the second plurality of data storage cartridges to the second multi-cartridge deep slot cell;

filling each data storage cartridge of the transported first subset of the second plurality of data storage cartridges in a tier of the second multi-cartridge deep slot cell so that the first subset of the second plurality of data storage cartridges is stored in the second multi-cartridge deep slot cell while maintaining the second tier order of the first subset of the second plurality of data storage cartridges;

scanning and extracting a second subset of the second plurality of data storage cartridges from the third multi-cartridge deep slot cell; and filling each data storage cartridge of the second subset of the second plurality of data storage cartridges in a tier of the third multi-cartridge deep slot cell so that the second subset of data storage cartridges of the second plurality of data storage cartridges is stored in the third multi-cartridge deep slot cell while maintaining the second tier order of the second subset of the second plurality of data storage cartridges.

25. The product of claim 24 wherein the first, second and third multi-cartridge deep slot cells are arranged in a column and wherein the inventory operations further comprise updating a cartridge audit data structure with the identify and location of each scanned data storage cartridge.

* * * * *